(12) United States Patent
Suzuki et al.

(10) Patent No.: US 7,877,521 B2
(45) Date of Patent: Jan. 25, 2011

(54) PROCESSING APPARATUS AND METHOD OF MODIFYING SYSTEM CONFIGURATION

(75) Inventors: Jun Suzuki, Tokyo (JP); Youichi Hidaka, Tokyo (JP); Junichi Higuchi, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 96 days.

(21) Appl. No.: 11/836,357

(22) Filed: Aug. 9, 2007

(65) Prior Publication Data

US 2008/0040526 A1    Feb. 14, 2008

(30) Foreign Application Priority Data

Aug. 11, 2006    (JP)    ............... 2006-219469

(51) Int. Cl.
*G06F 3/00* (2006.01)
(52) U.S. Cl. ............... 710/10; 710/17; 710/302
(58) Field of Classification Search ............... 710/8–11, 710/15–19, 300, 301, 302, 306, 311, 313
See application file for complete search history.

(56) References Cited

U.S. PATENT DOCUMENTS

| | | | |
|---|---|---|---|
| 7,096,305 B2 * | 8/2006 | Moll | 710/312 |
| 7,356,636 B2 * | 4/2008 | Torudbakken et al. | 710/313 |
| 2005/0235083 A1 * | 10/2005 | Tsushima et al. | 710/104 |
| 2006/0114918 A1 * | 6/2006 | Ikeda et al. | 370/408 |
| 2006/0136611 A1 * | 6/2006 | Futral et al. | 710/22 |
| 2006/0206648 A1 * | 9/2006 | Gupta et al. | 710/302 |
| 2006/0253619 A1 * | 11/2006 | Torudbakken et al. | 710/31 |
| 2007/0156942 A1 * | 7/2007 | Gough | 710/302 |
| 2007/0186025 A1 * | 8/2007 | Boyd et al. | 710/305 |
| 2007/0233928 A1 * | 10/2007 | Gough | 710/301 |
| 2008/0080491 A1 * | 4/2008 | Saripalli | 370/378 |
| 2008/0147937 A1 * | 6/2008 | Freimuth et al. | 710/104 |

FOREIGN PATENT DOCUMENTS

| | | | |
|---|---|---|---|
| JP | 64-76252 A | 3/1989 |
| JP | 10-187589 A | 7/1998 |
| JP | 2002-288104 A | 10/2002 |
| JP | 2004-531838 A | 10/2004 |

OTHER PUBLICATIONS

"PCI Express Base Specification Revision 1.1," PCI-SIG, Mar. 28, 2005, pp. 30, 319-330, 349-361.

* cited by examiner

*Primary Examiner*—Khanh Dang
(74) *Attorney, Agent, or Firm*—Sughrue Mion, PLLC

(57) ABSTRACT

A virtual PCI Express device 1600 indicates the presence of a pseudo I/O device in a PCI Express initial configuration cycle to reserve a resource space for a device anticipated to be installed in the future, and when an I/O device 1400 is inserted into an unoccupied slot 1605, a virtual PCI Express device control logic 1602 notifies a downstream PCI-PCI bridge 1504 via a hot-plugging control line 1601, and the downstream PCI-PCI bridge 1504 generates an interrupt to a CPU 1100 to notify it of insertion of the I/O device 1400 in conformance with the procedure for hot plugging defined by the PCI-SIG Standards, and configuration software 1000 invoked configures the inserted I/O device 1400.

31 Claims, 19 Drawing Sheets

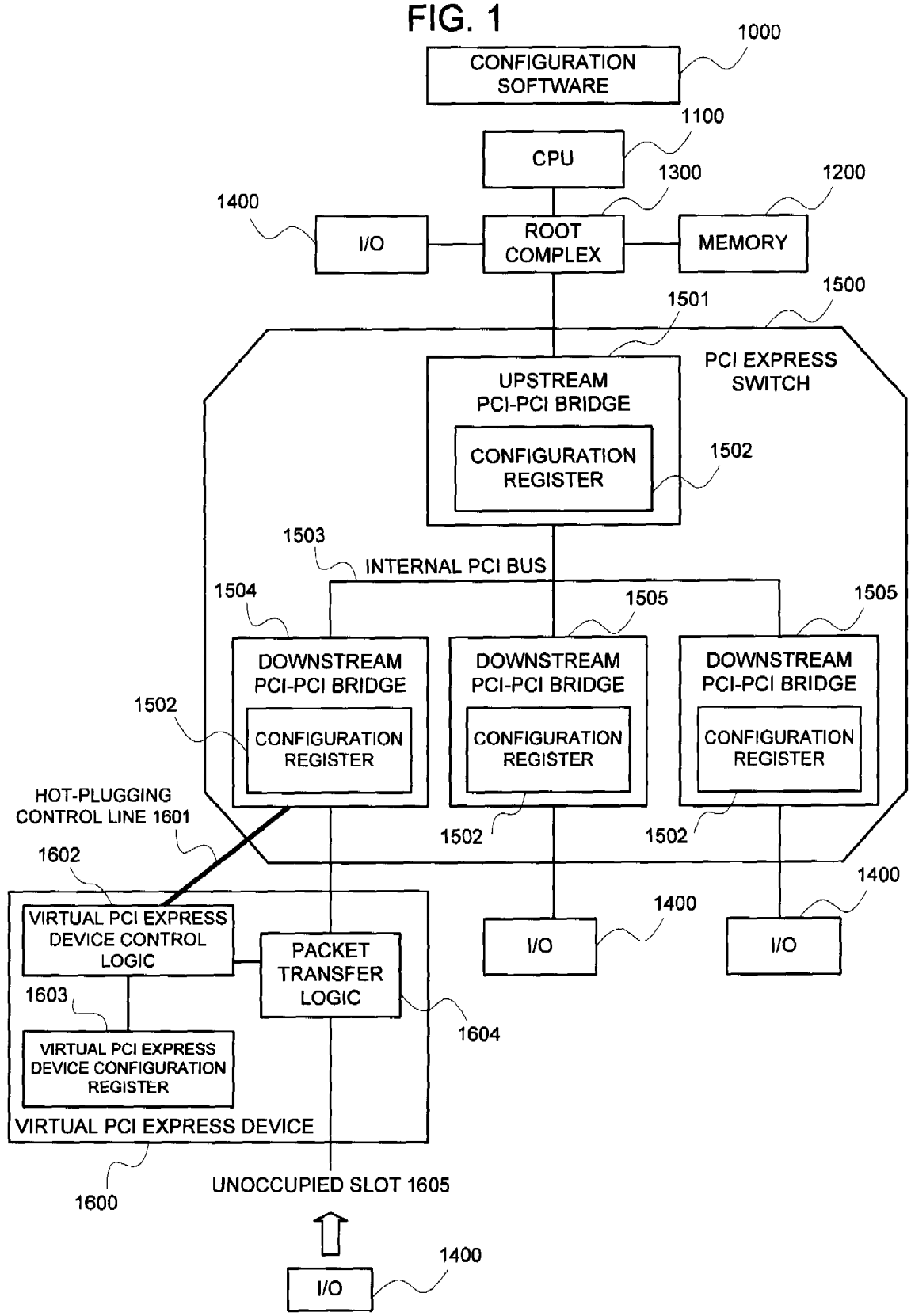

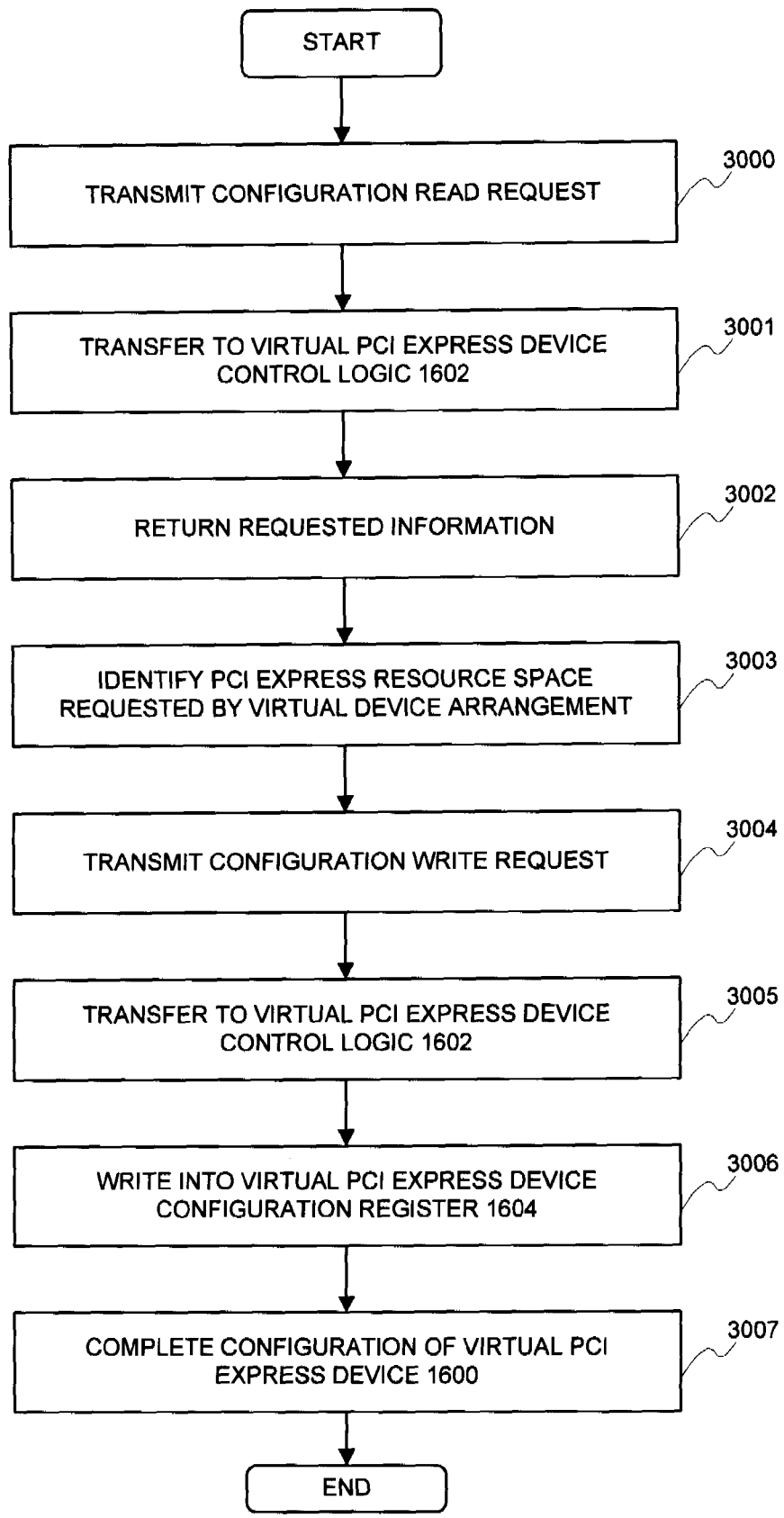

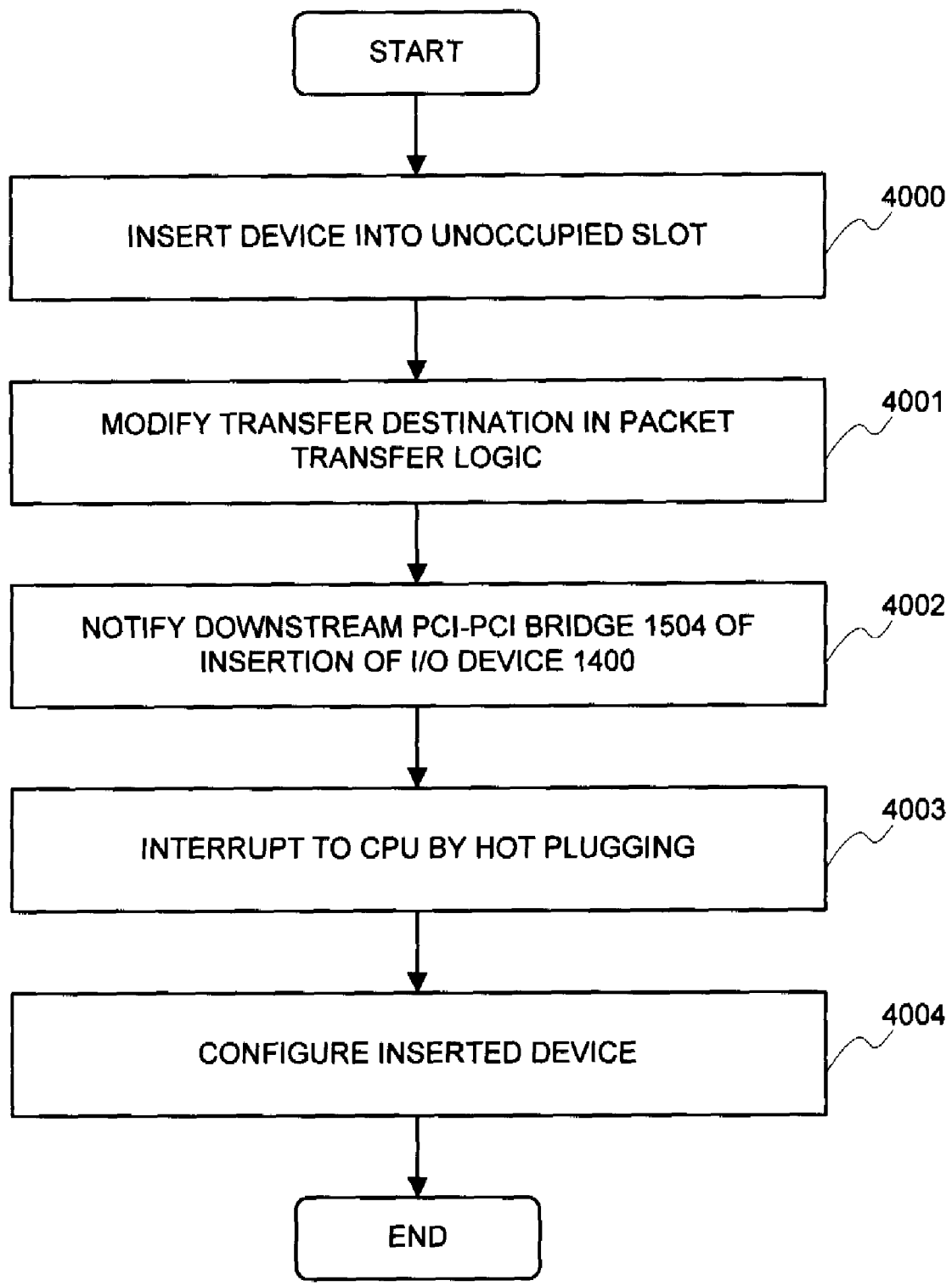

PROCESSING APPARATUS AND METHOD OF MODIFYING SYSTEM CONFIGURATION

INCORPORATION BY REFERENCE

This application claims the priority based on a Japanese Patent Application No. 2006-219469 filed on Aug. 11, 2006, disclosure of which is incorporated herein in its entirety by reference.

BACKGROUND ART

The present invention relates to a processing apparatus and a method of modifying a system configuration, and more particularly to a processing apparatus and a method of modifying a system configuration well suited to hot plugging of a device in a PCI Express system.

Conventionally, for standards of a bus for connecting a CPU with an I/O device inside a computer, parallel bus standards called PCI, which are standardized by the Peripheral Component Interconnect Special Interest Group (PCI-SIG), are commonly employed. Today, advanced versions of PCI, including PCI-X in which the transmission speed is improved, and PCI Express in which the parallel bus is serialized for communication using packets between connected devices, are standardized.

In the following description, a system comprised of mutually connected devices in PCI Express will be referred to as PCI Express system, several kinds of devices to be connected will be referred to as PCI Express devices, a bus for connecting the devices will be referred to as PCI Express bus, and packets for use in communication will be referred to as PCI Express packets. An exemplary conventional PCI Express system is disclosed in Non-patent Document 1 ("PCI Express Base Specification Revision 1.1," PCI-SIG, Mar. 28, 2005, pp. 30, 319-330, 349-361.).

Referring to FIG. 16, the conventional PCI Express system is comprised of: a root complex 1300 that connects to a CPU 1100 via a host bus and to a memory 1200 via a memory bus, for serving as a "root" of the tree topology of PCI Express; a PCI Express switch 5100 for providing a fan-out function to the PCI Express bus; and I/O devices 1400 connected via the PCI bus. In general, the side adjacent to the root complex 1300 of the tree topology of PCI Express is referred to as upstream, and that adjacent to the I/O devices 1400 is referred to as downstream. While in FIG. 16, three I/O devices are connected to the PCI Express switch 5100, the number of the I/O devices 1400 that can be connected is not limited to three. Reference numeral 1000 designates configuration software provided in the computer for the PCI Express system. Here, software held in the BIOS and OS for configuring the PCI device are generically called configuration software.

Referring to FIG. 17, the PCI Express switch 5100 comprises an upstream PCI-PCI bridge 1501, an internal PCI bus 1503, and downstream PCI-PCI bridges 1505. The upstream PCI-PCI bridge 1501 and downstream PCI-PCI bridges 1505 comprise respective configuration registers 1502 for retaining information on PCI Express resource spaces connected downstream of the respective bridges. The PCI Express resource spaces are spaces occupied under several addresses used in a PCI Express system. An attention button 17001 is a button for use by a user when he/she starts a hot-plugging operation.

FIG. 18A and FIG. 18B are block diagrams showing the internal arrangement of the configuration register. The configuration register includes two types: Type 1 and Type 0, and the configuration register of Type 1 is used in a PCI-PCI bridge, and that of Type 0 is used in an I/O device.

The configuration registers of Type 1 and Type 0 retain in common a device ID 18011, a vendor ID 18012, and a class code 18013. The device ID designates a device number specific to a vendor, the vendor ID designates the number of a manufacturer, and the class code designates a device attribute. The configuration software 1000 can identify what kind of a device it is by looking up these three registers.

The configuration register of Type 1 additionally has a lower limit value 18001 and an upper limit value 18002 of the bus number required in packet routing to a downstream bus, a lower limit value 18003 and an upper limit value 18004 of a 32-bit I/O space, and a lower limit value 18005 and an upper limit value 18006 of a 32-bit memory space, and in some cases, a lower limit value 18007 and an upper limit value 18008 of a 64-bit I/O memory space. These values are written in by the configuration software 1000 during initial configuration of PCI Express. Moreover, the configuration register of Type 1 comprises a hot-plugging register 18014 as standard.

On the other hand, the configuration register of Type 0 retains at least one base address register 18021 indicating two address spaces, i.e., a memory space and an I/O space, required by an I/O device. The base address register 18021 is also used by the configuration software 1000 for writing a base address when allocating an address space for the I/O device.

The conventional PCI Express system having such an arrangement operates as follows:

Upon start of a PCI Express initial configuration cycle, all PCI Express devices present in a PCI Express system are searched for by the configuration software 1000. In particular, all PCI buses in the system are scanned, and each slot in every PCI bus is checked for the attribute of a PCI Express device occupying the slot. Then configuration is achieved by sequentially allocating a PCI Express resource space required by each PCI Express device that is found. For example, in the PCI Express system shown in FIG. 16, the I/O devices 1400 connected downstream of the PCI Express switch 5100 are assigned with respective resource spaces that they require, and according to the size of the spaces assigned, values in the configuration registers 1502 of the downstream PCI-PCI bridges 1505 and upstream PCI-PCI bridge 1501 of the PCI Express switch 5100 are set, including the lower limit value 18001 and upper limit value 18002 of the bus number, the lower limit value 18003 and upper limit value 18004 of the 32-bit I/O space, the lower limit value 18005 and upper limit value 18006 of the 32-bit memory space, etc.

Communication from the CPU 1100 to an I/O device 1400, etc. is executed according to the configuration registers 1502 set as described above, in the following manner: For communication from the CPU 1100 to an I/O device 1400 connected to the PCI Express switch 5100, a PCI Express packet is generated at the root complex 1300 at the command by the CPU 1100, and is transmitted to the upstream PCI-PCI bridge 1501 in the PCI Express switch 5100. The upstream PCI-PCI bridge 1501 looks up the configuration register 1502, and decides whether the destination of the PCI Express packet is connected to a PCI Express bus downstream of the bridge itself. If the destination is connected to a PCI Express bus downstream of the bridge itself, the PCI Express packet is broadcast to all the downstream PCI-PCI bridges 1505. Each downstream PCI-PCI bridge 1505 decides whether the destination is connected to a PCI Express bus downstream of the bridge itself via the same function as that of the aforementioned upstream PCI-PCI bridge 1501, and transfers the PCI Express packet to a PCI Express bus to which the destination I/O device 1400 connects.

When communication is made from an I/O device 1400 connected to the PCI Express switch 5100 to the CPU 1100, the aforementioned procedure for PCI Express packet transfer from the CPU 1100 to an I/O device 1400 is inverted. Specifically, the upstream PCI-PCI bridge 1501 and downstream PCI-PCI bridge 1505 each transfer a PCI Express packet to the upstream of the bridge itself if the destination of the packet does not correspond to a PCI Express resource space downstream of the bridge itself, as indicated by its configuration register 1502. When the PCI Express packet is to be transferred from the downstream PCI-PCI bridge 1505 to the upstream PCI-PCI bridge 1501, uni-casting is employed instead of broadcasting.

Moreover, PCI Express provides a hot-plugging function for active connection/disconnection of a plug of an I/O device to/from an unoccupied slot (see Non-patent Document 1, for example). Hot plugging in the conventional PCI Express operates as follows: When an I/O device 1400 is inserted into a downstream slot of a downstream PCI-PCI bridge 1505, a link is established between the downstream PCI-PCI bridge 1505 and I/O device 1400, and synchronization of electric signals, exchange of credit information and the like are automatically activated. Subsequently, upon a press of the attention button 17001 by the user, the downstream PCI-PCI bridge 1505 turns the hot-plugging register 18014 on, and at the same time generates an interrupt to the CPU 1100. Triggered by the interrupt, the configuration software 1000 is invoked to configure the inserted I/O device 1400 and clear the hot-plugging register 18014. After completion of the configuration, the inserted I/O device 1400 is enabled.

In addition, a technique of dynamically modifying the configuration of a computer system is disclosed in Patent Document 1 (JP-P1989-76252A), although this is not a technique relating to PCI Express or hot plugging. This conventional technique involves registering I/O devices connected to the computer system and those anticipated to be installed in the future together into an I/O table beforehand as actual devices and reserved devices, respectively, providing a flag in the I/O table for identifying each I/O device as being in an actual device status or in a reserved device status, and changing each device from an actual one to a reserved one or vice versa by setting/resetting the flag during the operation of the system. The I/O table is a table that is registered in an external storage device as an object and then developed onto a main storage device by executing system generation processing, for being looked up by the OS in controlling the I/O device.

Hot plugging is a technique that allows an I/O device or the like to be physically attached or removed while other devices in a system are in service. In the conventional PCI Express system, the primary hot-plugging function works in a case, for example, in which the I/O device 1400 that was attached to the PCI Express switch 5100 in FIG. 16 during the initial configuration cycle is replaced by a similar I/O device 1400 because the former one has broken down. However, it is substantially impossible to hot-plug a new I/O device into a slot that was unoccupied during the initial configuration cycle.

The reason of this is that during the initial configuration cycle by the configuration software 1000 of the PCI Express system provided in a conventional computer (which cycle will be sometimes referred to as PCI Express initial configuration cycle hereinbelow), a bus number is assigned to the PCI Express bus, and a device number, a function number, a 32-bit I/O space, a 32-bit memory space, and if necessary, a 64-bit memory space, are assigned to the PCI Express switch and I/O device, in a sequential manner; however, they are not assigned to an unoccupied slot. Thus, when an I/O device is inserted into an unoccupied slot in the PCI Express switch, a PCI Express resource space to be assigned to the inserted I/O device may interfere with that for another device having been using that space, even if the configuration software 1000 of the PCI Express system is adapted for hot plugging of an I/O device defined by the PCI-SIG Standards. Therefore, installation of an I/O device into an unoccupied slot requires reconfiguration of the whole PCI Express system, including the configuration registers held by the upstream PCI-PCI bridge and downstream PCI-PCI bridges in the PCI Express switch, and the base address registers held by other I/O devices containing information on the PCI Express resource spaces that have been allocated, and thus, a desired I/O device cannot be hot-plugged while services provided by other I/O devices are continued.

For a similar reason to the above, it is difficult in the conventional PCI Express system to hot-plug an I/O device into a root complex, hot-plug a PCI Express switch into a PCI Express switch, hot-plug a PCI Express switch into a root complex, and hot-plug a downstream PCI-PCI bridge into an upstream PCI-PCI bridge in a PCI Express switch.

Moreover, for hot plugging of devices other than I/O devices, i.e., for hot plugging of a PCI Express switch into a PCI Express switch and into a root complex, and hot plugging of a downstream PCI-PCI bridge into an upstream PCI-PCI bridge in a PCI Express switch, the configuration software 1000 that merely supports hot plugging of I/O devices among those defined in the PCI-SIG Standards cannot configure a hot-plugged PCI Express switch or downstream PCI-PCI bridge, this being one of the reasons why these kinds of hot plugging are difficult.

On the other hand, for I/O devices etc. anticipated to be installed in the future, Patent Document 1 discloses the idea of defining them beforehand as reserved devices in the I/O table looked up by the OS. Now consider that this idea be applied to a PCI Express system. Since the I/O table as disclosed in Patent Document 1 is a set of data looked up by the OS to control I/O devices, the table corresponds to a PCI data structure representing the PCI topology of a PCI system in terms of a PCI Express system. Thus, when the idea of Patent Document 1 is applied to a PCI Express system, the PCI data structure is added with a flag for discriminating each device between an actual one and a reserved one, and the device is changed from an actual one to a reserved one or vice versa by setting/resetting the flag during an operation of the system. However, this method poses a problem that a device to be inserted must be identified beforehand, and also a problem that, since the PCI data structure is created by the configuration software 1000 during the initial configuration and looked up in subsequent control, the existing configuration software 1000, and hence, the OS itself, should be modified so that it can handle the flag for discriminating each I/O device between an actual one and a reserved one.

SUMMARY OF THE INVENTION

The present invention is made to solve the above-mentioned problems.

Moreover, an exemplary object of the present invention is to provide a novel technique that enables hot plugging of an I/O device etc. into a PCI Express switch etc. using existing configuration software.

Furthermore, another objective of the present invention is to provide a processing apparatus used by being connected to an unoccupied slot at which a new device is anticipated to be installed, for reserving a resource space for a device to be installed in the future, and when such a device is newly installed, being logically replaced with the device.

Still another objective of the present invention is to enable hot plugging of a PCI Express switch into a PCI Express switch, hot plugging of a PCI Express switch into a root complex, and hot plugging of a downstream PCI-PCI bridge into an upstream PCI-PCI bridge, using configuration software that merely supports hot plugging of an I/O device.

An exemplary object of the present invention is achieved by a first processing apparatus connected to a bus, comprising: a slot; a pseudo-device; and a communication relay for relaying communication between the bus and the pseudo-device when no device is connected to the slot, and for relaying communication between the bus and the slot when a device is connected to the slot.

An exemplary object of the present invention is achieved by a second processing apparatus wherein, in the first processing apparatus, the pseudo-device comprises one or more configuration registers, and a controller for performing write and read operations on the configuration registers.

An exemplary object of the present invention is achieved by a third processing apparatus wherein, in the second processing apparatus, the pseudo-device retains topology information of the pseudo-device itself, and the controller performs write and read operations on the configuration registers based on the topology information.

An exemplary object of the present invention is achieved by a fourth processing apparatus wherein, in the second processing apparatus, the controller generates an interrupt to a CPU when a device is inserted into the slot.

An exemplary object of the present invention is achieved by a fifth processing apparatus wherein, in the second processing apparatus, the controller generates a first interrupt to a CPU when a device is removed from the slot and the slot is an unoccupied slot, and generates a second interrupt to the CPU when a new device is inserted into the unoccupied slot.

An exemplary object of the present invention is achieved by a sixth processing apparatus wherein, in the second processing apparatus, the controller uses information on a resource space allocated to the pseudo-device to partially or fully make a configuration on the device inserted into the slot.

An exemplary object of the present invention is achieved by a seventh processing apparatus wherein, in the sixth processing apparatus, the controller generates an interrupt to a CPU upon completion of the configuration.

An exemplary object of the present invention is achieved by a eighth processing apparatus wherein, in the seventh processing apparatus, the configuration made by the controller before generating the interrupt is directed to a device which is not supported by configuration on a device made by configuration software activated by an interrupt to the CPU.

An exemplary object of the present invention is achieved by an ninth processing apparatus wherein, in the fourth, fifth or sixth processing apparatus, the interrupt is in compliance with a procedure for hot plugging defined by PCI-SIG Standards.

An exemplary object of the present invention is achieved by a tenth processing apparatus wherein, in the first processing apparatus, standards of the bus are PCI.

An exemplary object of the present invention is achieved by a eleventh processing apparatus wherein, in the first processing apparatus, standards of the bus are PCI-X.

An exemplary object of the present invention is achieved by an twelfth processing apparatus wherein, in the first processing apparatus, standards of the bus are PCI Express.

An exemplary object of the present invention is achieved by a thirteenth processing apparatus wherein, in the twelfth processing apparatus, the apparatus is connected to or incorporated into a device constituting a PCI Express switch.

An exemplary object of the present invention is achieved by a fourteenth processing apparatus wherein, in the thirteenth processing apparatus, the device to be connected to the slot is any one of an I/O device, a PCI Express switch, and a downstream PCI-PCI bridge.

An exemplary object of the present invention is achieved by a fifteenth processing apparatus wherein, in the twelfth processing apparatus, the apparatus is connected to or incorporated into a device constituting a root complex.

An exemplary object of the present invention is achieved by a sixteenth processing apparatus wherein, in the fifteenth processing apparatus, the device to be connected to the slot is any one of an I/O device and a PCI Express switch.

An exemplary object of the present invention is achieved by a first method of modifying a system configuration comprising: a first step of making an initial configuration by configuration software executed by a CPU in a system with a processing apparatus incorporated into the system, the processing apparatus connected to a bus, and comprising a slot, a pseudo-device, and a communication relay for relaying communication between the bus and the pseudo-device when no device is connected to the slot, and for relaying communication between the bus and the slot when a device is connected to the slot; and a second step of, when a device is inserted into the slot, making a configuration on the inserted device.

An exemplary object of the present invention is achieved by a second method of modifying a system configuration wherein, in the first method of modifying a system configuration, the pseudo-device comprises one or more configuration registers, and a controller for performing write and read operations on the configuration registers, and during the initial configuration, the configuration software makes a configuration on the pseudo-device by performing write and read on the configuration registers through the controller.

An exemplary object of the present invention is achieved by a third method of modifying a system configuration wherein, in the second method of modifying a system configuration, the pseudo-device retains topology information of the pseudo-device itself, and the controller performs write and read operations on the configuration registers based on the topology information.

An exemplary object of the present invention is achieved by a fourth method of modifying a system configuration wherein, in the second method of modifying a system configuration, the controller generates an interrupt to the CPU when a device is inserted into the slot.

An exemplary object of the present invention is achieved by a fifth method of modifying a system configuration wherein, in the second method of modifying a system configuration, the controller generates a first interrupt to a CPU when a device is removed from the slot and the slot is an unoccupied slot, and generates a second interrupt to the CPU when a new device is inserted into the unoccupied slot.

An exemplary object of the present invention is achieved by a sixth method of modifying a system configuration wherein, in the second method of modifying a system configuration, at the second step, the controller uses information on a resource space allocated to the pseudo-device during the initial configuration, to partially or fully make a configuration on the device inserted into the slot.

An exemplary object of the present invention is achieved by a seventh method of modifying a system configuration wherein, in the sixth method of modifying a system configuration, the controller generates an interrupt to the CPU upon completion of the configuration.

An exemplary object of the present invention is achieved by a eighth method of modifying a system configuration wherein, in the seventh method of modifying a system configuration, the configuration made by the controller before generating the interrupt is directed to a device which is not supported by configuration on a device made by configuration software activated by an interrupt to the CPU.

An exemplary object of the present invention is achieved by an ninth method of modifying a system configuration wherein, in the fourth, fifth or seventh method of modifying a system configuration, the interrupt is in compliance with a procedure for hot plugging defined by PCI-SIG Standards.

An exemplary object of the present invention is achieved by a tenth method of modifying a system configuration wherein, in the ninth method of modifying a system configuration, the configuration made by the configuration software activated by the interrupt is in compliance with the procedure for hot plugging defined by the PCI-SIG Standards.

An exemplary object of the present invention is achieved by an eleventh method of modifying a system configuration wherein, in the first method of modifying a system configuration, standards of the bus are PCI.

An exemplary object of the present invention is achieved by a twelfth method of modifying a system configuration wherein, in the first method of modifying a system configuration, standards of the bus are PCI-X.

An exemplary object of the present invention is achieved by a thirteenth method of modifying a system configuration wherein, in the first method of modifying a system configuration, standards of the bus are PCI Express.

An exemplary object of the present invention is achieved by a fourteenth method of modifying a system configuration wherein, in the thirteenth method of modifying a system configuration, the processing apparatus is connected to or incorporated into a device constituting a PCI Express switch, and the device to be connected to the slot is any one of an I/O device, a PCI Express switch, and a downstream PCI-PCI bridge.

An exemplary object of the present invention is achieved by a fifteenth method of modifying a system configuration wherein, in the thirteenth method of modifying a system configuration, the processing apparatus is connected to or incorporated into a device constituting a root complex, and the device to be connected to the slot is any one of an I/O device and a PCI Express switch.

BRIEF DESCRIPTION OF THE DRAWINGS

This and other objects, features and advantages of the present invention will become more apparent upon a reading of the following detailed description and drawings, in which:

FIG. 1 is a block diagram showing an arrangement of a first embodiment of the present invention;

FIG. 3 is a flow chart showing an operation of an initial configuration cycle in the first embodiment of the present invention;

FIG. 4 is a flow chart showing an operation in hot plugging in the first embodiment of the present invention;

EXEMPLARY EMBODIMENTS

Now exemplary embodiments of the invention will be described in detail. Any one of the embodiments described below includes inventions wherein, when a processing apparatus in accordance with the present invention is incorporated in a system with no device connected to a slot thereof and initial configuration is started by configuration software, a communication relay in the processing apparatus relays communication between a pseudo-device and the configuration software, thus configuring the pseudo-device. Since the pseudo-device is provided with configuration registers as in an ordinary device, the configuration software can perform configuration involving allocating resources to the pseudo-device in a similar operation to that for the ordinary device.

Thereafter, once the system has been started up and when a device is connected to the slot in the processing apparatus of the present invention, an interrupt is generated to the CPU and at the same time communication between the device inserted into the slot and configuration software is relayed by the communication relay in the processing apparatus, thus configuring the device inserted into the slot. From the viewpoint of the configuration software, the device looks as if it were hot-plugged in place of the pseudo-device recognized in the initial configuration. Thus, if the configuration registers are set such that the pseudo-device requires a resource space larger than that required by a device anticipated to be installed in the future, the device inserted into the slot is configured within the range of the resource space allocated to the pseudo-device.

When a device inserted into the slot in the processing apparatus in accordance with the present invention is a PCI Express switch or a downstream PCI-PCI bridge, configuration software that merely supports hot plugging of an I/O device cannot handle configuration on such a processing apparatus. In this case, a controller in the processing apparatus in accordance with the present invention configures such a processing apparatus, then generates an interrupt to the CPU, and causes the configuration software to configure an I/O device connected to the PCI Express switch or downstream PCI-PCI bridge inserted into the slot.

A First Exemplary Embodiment

Figure 16:
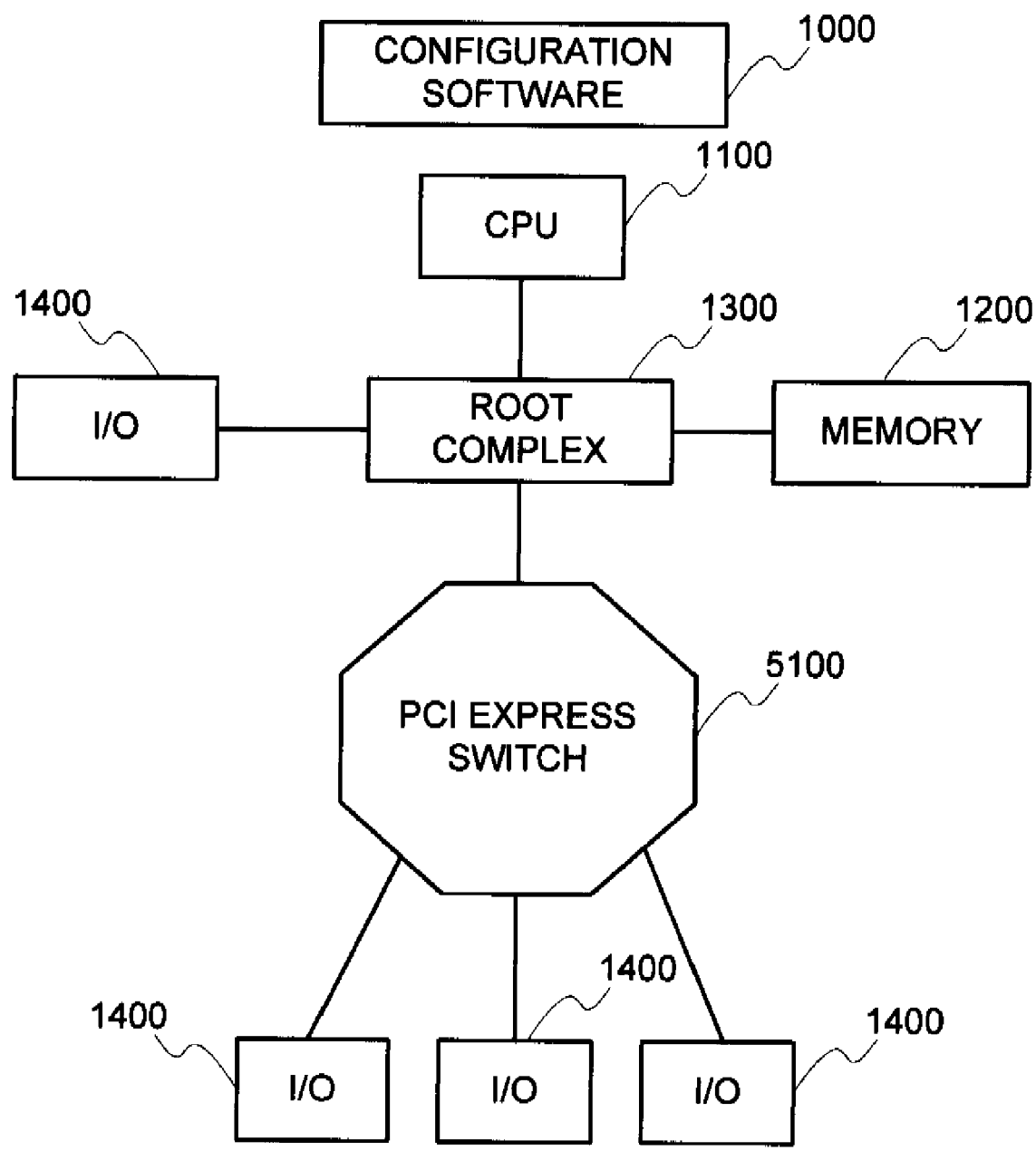
FIG. 16 is a block diagram of a conventional PCI Express system.
Figure 17:
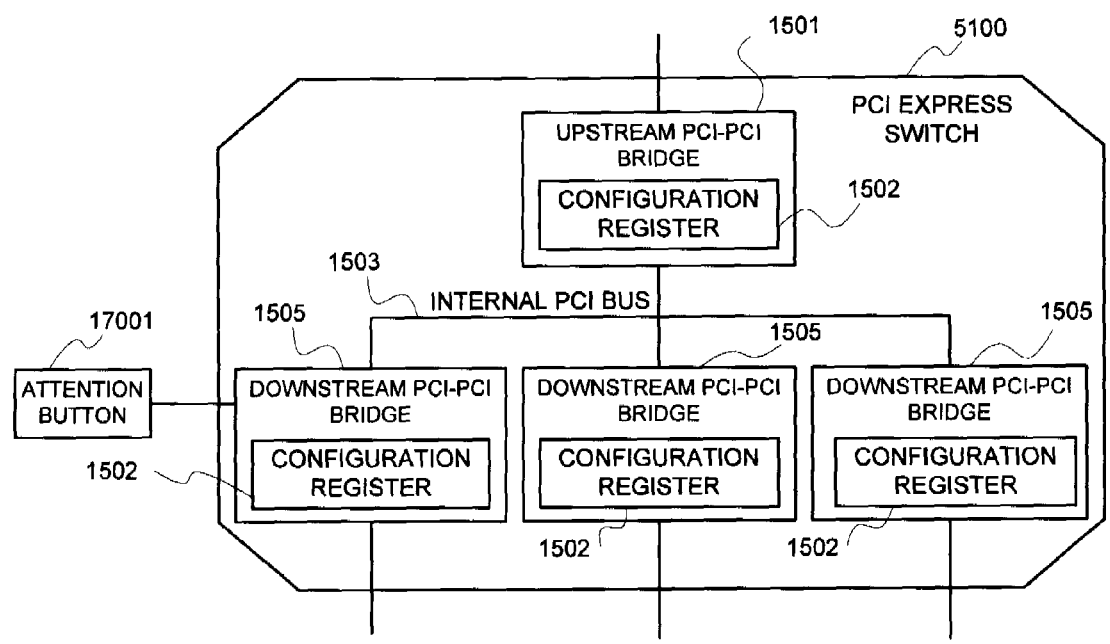
FIG. 17 is a block diagram of a conventional PCI Express switch.

Referring to FIG. 1, a first embodiment of the present invention is different from the conventional PCI Express system shown in FIG. 16 in that a virtual PCI Express device 1600 is included, and one of the downstream PCI-PCI bridges 1505 in the PCI Express switch 1500 is replaced with a downstream PCI-PCI bridge 1504. Moreover, the configuration software 1000 for the PCI Express system executed by the CPU 1100 configures the PCI Express system in a PCI Express initial configuration cycle at the startup of the computer, and in hot plugging of a PCI Express device such as a PCI Express switch 1500 or an I/O device 1400.

The virtual PCI Express device 1600 comprises a hot-plugging control line 1601, a packet transfer logic 1604 for transferring PCI Express packets, a virtual PCI Express device control logic 1602 for controlling the operation of the device 1600 itself, a virtual PCI Express device configuration register 1603 for indicating that the virtual device is present to the PCI Express initial configuration cycle, and an unoccupied slot 1605 for hot-plugging the I/O device 1400.

The packet transfer logic 1604 transfers a PCI Express packet received from the downstream PCI-PCI bridge 1504 to the virtual PCI Express device control logic 1602 in a period from the PCI Express initial configuration cycle to hot plugging of a new I/O device 1400 into the unoccupied slot 1605. After hot-plugging the I/O device 1400 into the unoccupied 1605, the packet transfer logic 1604 transfers a PCI Express packet received from the downstream PCI-PCI bridge 1504 to the hot-plugged I/O device 1400.

The virtual PCI Express device control logic 1602, in combination with the virtual PCI Express device configuration register 1603, constitutes a pseudo-device. If the PCI Express packet received from the packet transfer logic 1604 represents configuration access, the virtual PCI Express control logic 1602 performs required write and read operations on the virtual PCI Express configuration register 1603. It also reacts to other PCI Express packets to control the device 1600 itself or return a PCI Express packet. On the other hand, when the I/O device 1400 is inserted into the unoccupied slot 1605, the logic 1602 notifies the downstream PCI-PCI bridge 1504 of the fact using the hot-plugging control line 1601.

The virtual PCI Express configuration register 1603 undergoes write and read by a PCI Express packet for configuration access in the PCI Express initial configuration cycle, for notification of the presence of the virtual PCI Express device 1600 and for reservation of a desired PCI Express resource space by requesting allocation of the PCI Express resource space. At that time, the virtual PCI Express device configuration register 1603 contains information indicating the presence of a PCI-PCI bridge in which the virtual PCI Express device 1600 is defined according to the PCI-SIG Standards, or a certain I/O device 1400, or a combination of a plurality of them.

Figure 2A:
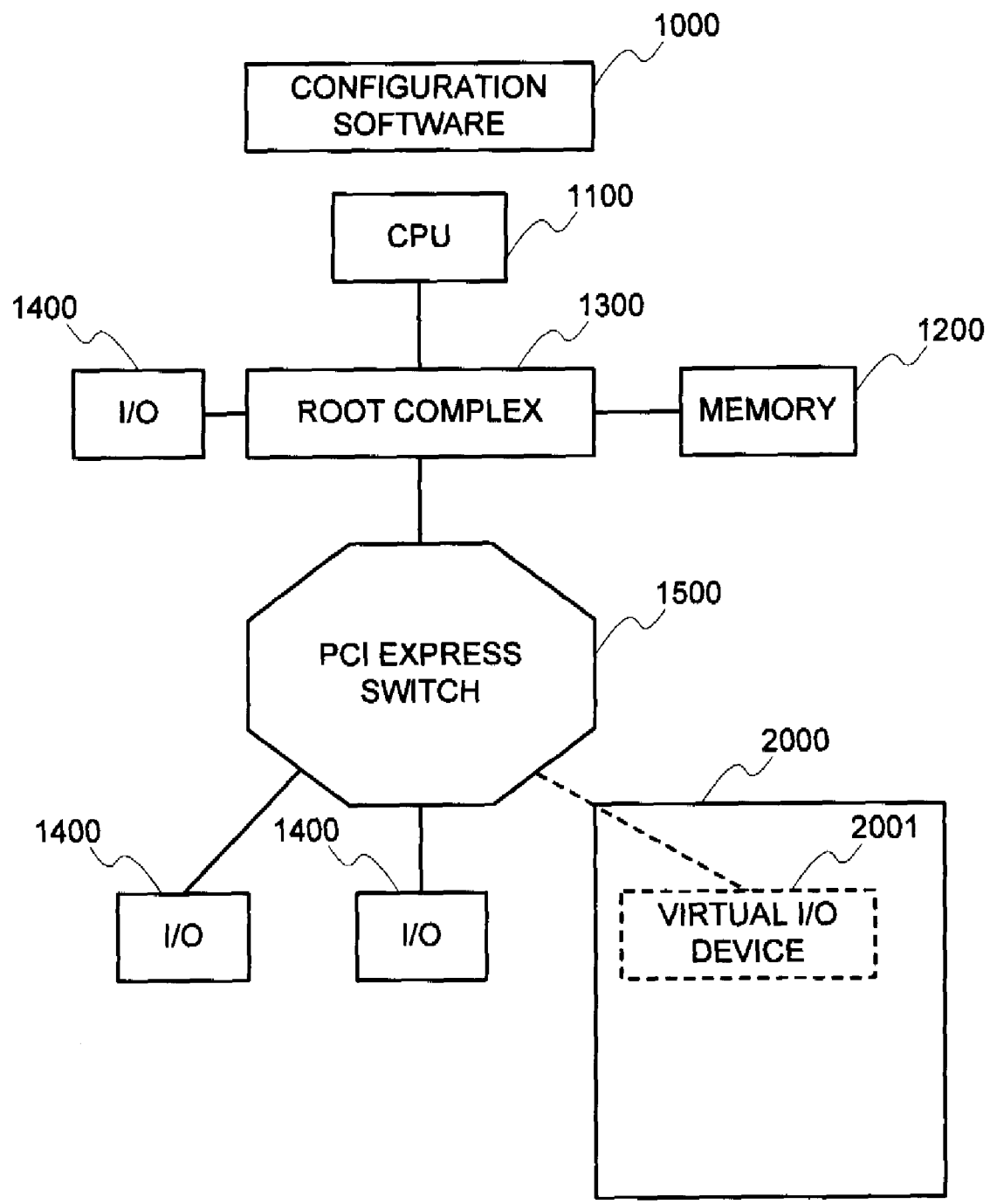
FIG. 2A is an explanatory diagram of a virtual device arrangement, the presence of which is indicated by the processing apparatus in accordance with the present invention to configuration software.
Figure 2B:
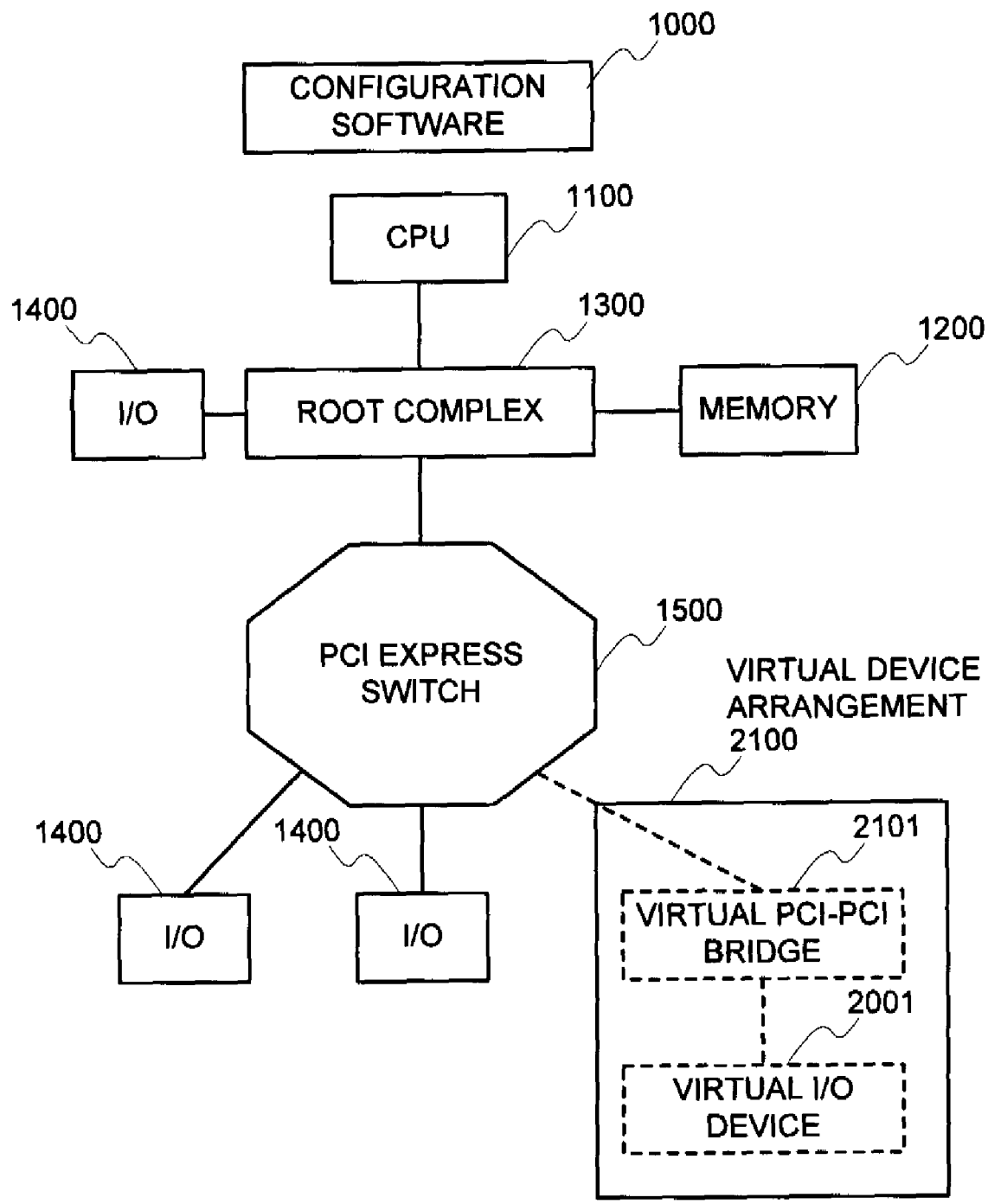
FIG. 2B is an explanatory diagram of a virtual device arrangement, the presence of which is indicated by the processing apparatus in accordance with the present invention to configuration software.

FIG. 2A and FIG. 2B show specific examples of the arrangement of a PCI Express device in which the virtual PCI Express device configuration register 1603 virtually indicates its presence to the configuration software 1000. These specific examples will be referred to as virtual device arrangements hereinbelow.

Figure 18A:
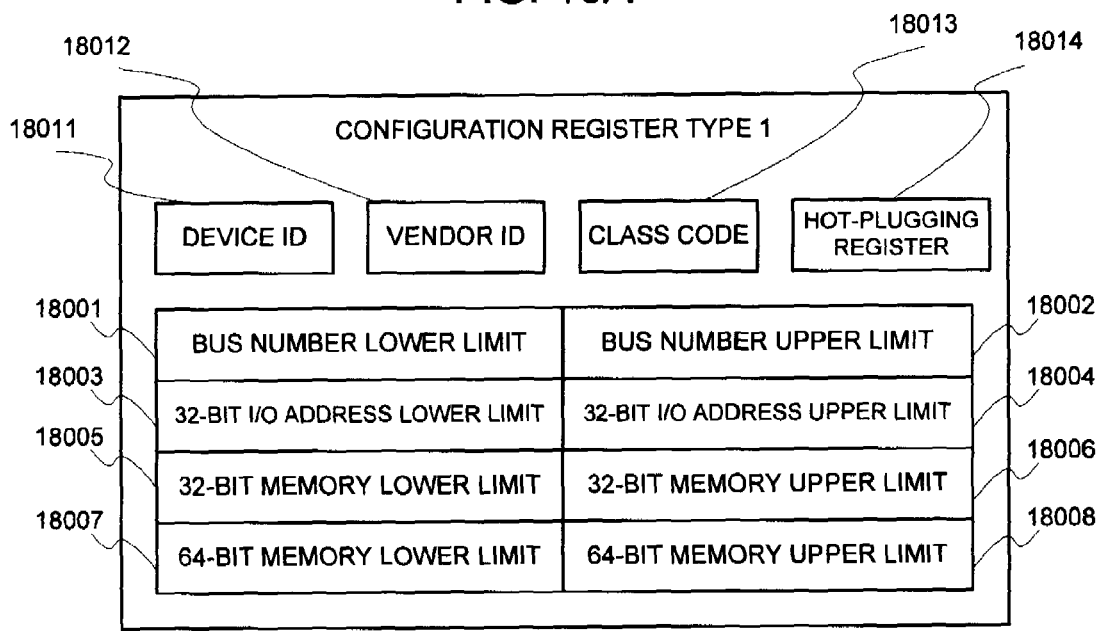
FIG. 18A is an explanatory diagram of configuration registers.
Figure 18B:
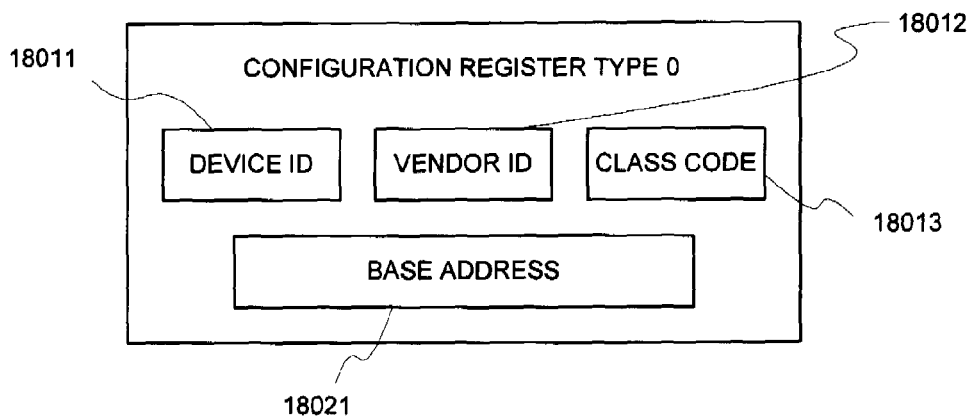
FIG. 18B is an explanatory diagram of configuration registers.

Referring to FIG. 2A, a virtual device arrangement 2000 comprises a virtual I/O device 2001 indicating the presence of a certain I/O device 1400. In this case, the virtual PCI Express device configuration register 1603 holds one configuration register of Type 0 shown in FIG. 18B for representing the virtual I/O device 2001 by the values specified in the device ID, vendor ID and class code, and requests a resource space for the virtual I/O device 2001 by the value specified in the base address.

In another example shown in FIG. 2B, a virtual device arrangement 2100 comprises a virtual PCI-PCI bridge 2101 indicating the presence of a PCI-PCI bridge defined according to the PCI-SIG Standards, and a virtual I/O device 2001 connected thereto. In this case, the virtual PCI Express device configuration register 1603 holds one configuration register of Type 1 shown in FIG. 18A and one configuration register of Type 0 shown in FIG. 18B. The values specified in the device ID, vendor ID and class code in the configuration register of Type 1 indicate the virtual PCI-PCI bridge 2101. The values specified in the device ID, vendor ID and class code in the configuration register of Type 0 indicate the virtual I/O device 2001, and the value specified in the base register thereof indicates a resource space required by the virtual I/O device 2001. When the presence of a plurality of virtual devices is indicated as in the example of FIG. 2B, the virtual PCI Express device configuration register 1603 is appended with information indicating the connection relationship among the virtual devices (topology information). The virtual PCI Express device control logic 1602 performs routing of PCI Express packets to cause the configuration software 1000 to read the plurality of configuration registers in a sequence indicated by the topology information. That is, the configuration software 1000 regards a register read earlier as lying upstream, and accordingly, the configuration registers are arranged such that one for a virtual device connected more upstream is read earlier.

While in FIG. 2B the one-stage virtual PCI-PCI bridge 2101 is installed, it is possible to provide a multi-stage arrangement of the virtual PCI-PCI bridges 2101 or an arrangement including no virtual I/O device 2001 and including only the virtual PCI-PCI bridge(s) 2101. Moreover, it is easily recognized by those skilled in the art that the virtual PCI Express device configuration register 1603 indicating the presence of a PCI Express switch or other PCI Express devices, as well as a PCI-PCI bridge and an I/O device, may be used in this application. In any case, the virtual PCI Express device configuration register 1603 reserves a desired PCI Express resource space by this virtual device arrangement.

A role of the virtual I/O device 2001 is to reserve beforehand a PCI address space indicated by the configuration register 1502 of Type 1 provided in the downstream PCI-PCI bridge 1504 connected upstream, for an I/O device 1400 to be inserted into the unoccupied slot 1605 in the future. The PCI address space to be reserved does not have to completely match an address space needed for the I/O device 1400 to be inserted in the future, and may be an address space larger than that. Moreover, the class code in the configuration register of Type 0 in the virtual I/O device 2001 does not have to match the type of the I/O device 1400 to be inserted in the future. This is because, even if they are different, the difference will be absorbed by configuration in hot plugging made by the configuration software 1000.

Referring again to FIG. 1, triggered by notification from the hot-plugging control line 1601 indicating that a new I/O device 1400 is inserted into the unoccupied slot 1605, the downstream PCI-PCI bridge 1504 generates an interrupt to the CPU 1100 to notify it that insertion of the I/O device 1400 has occurred at the downstream PCI Express bus connected to the bridge itself.

Next, an operation in a PCI Express initial configuration cycle in accordance with the present embodiment will be described in detail with reference to FIG. 1 and a flow chart shown in FIG. 3 hereinbelow.

Once the PCI Express initial configuration cycle has been started, the PCI Express switch 1500 and I/O devices 1400 provided in the PCI Express system are sequentially checked and assigned with respective PCI Express resource spaces required by these devices to achieve configuration. This configuration generally produces data sometimes called PCI data structure, which represents the PCI topology of the PCI system.

When the virtual PCI Express device 1600 becomes a target of the PCI Express configuration cycle, the configuration software 1000 transmits a PCI Express packet representing a configuration read request for checking the arrangement of the virtual PCI Express device (Step 3000). The packet transfer logic 1604 receives the PCI Express packet via the downstream PCI-PCI bridge 1504, and transfers it to the virtual PCI Express device control logic 1602 (Step 3001). The virtual PCI Express device control logic 1602 reads information requested by the configuration read request from the virtual PCI Express device configuration register 1603, creates a PCI Express packet and sends it back as a response (Step 3002). The returned information contains information on the virtual device arrangement that the virtual PCI Express device 1600 represents, and the configuration software 1000 identifies a PCI Express resource space requested by the virtual device arrangement of the virtual PCI Express device 1600 (Step 3003).

The configuration software 1000 subsequently transmits a PCI Express packet representing a configuration write request for allocating the requested PCI Express resource space (Step 3004). The packet transfer logic 1604 receives the PCI Express packet via the downstream PCI-PCI bridge 1504, and transfers it to the virtual PCI Express device control logic 1602, as with the configuration read request (Step 3005). The virtual PCI Express device control logic 1602 executes writing into the virtual PCI Express device configuration register 1603 according to the contents in the received PCI Express packet (Step 3006), whereby configuration on the virtual PCI Express device 1600 is completed (Step 3007).

When the arrangement of the virtual PCI Express device that the virtual PCI Express device represents comprises a plurality of devices, Steps 3000-3006 are repeated as needed. In particular, Steps 3000-3003 are repeated for every one of the plurality of devices (all of the plurality of devices are recognized), and then, Steps 3004-3006 are repeated to configure the individual devices. Thus, the virtual PCI Express device 1600 reserves a PCI Express resource space for use by an I/O device 1400 to be inserted later into the unoccupied slot 1605.

Next, an operation in hot-plugging an I/O device 1400 into the unoccupied slot 1605 in accordance with the present embodiment will be described in detail with reference to FIG. 1 and a flow chart shown in FIG. 4 hereinbelow.

Upon insertion of an I/O device 1400 into the unoccupied slot 1605 (Step 4000), the virtual PCI Express device control logic 1602 sets the packet transfer logic 1604 to transfer all PCI Express packets received from the downstream PCI-PCI bridge 1504 thereafter to the inserted I/O device 1400 (Step 4001). Subsequently, the virtual PCI Express device control logic 1602 notifies the downstream PCI-PCI bridge 1504 via the hot-plugging control line 1601 that the I/O device 1400 is inserted into the unoccupied slot 1605 (Step 4002).

Upon receipt of the notification from the I/O device 1400, the downstream PCI-PCI bridge 1504 generates an interrupt to the CPU 1100 to notify it that the I/O device 1400 is inserted (Step 4003). At the CPU 1100 receiving the interrupt, the configuration software 1000 is invoked to configure the I/O device 1400 inserted into the unoccupied slot 1605 (Step 4004). Steps 4003 and 4004 are executed in conformance with the procedure for hot plugging defined by the PCI-SIG Standards.

By the preceding steps, hot plugging of the I/O device 1400 inserted into the unoccupied slot 1605 is completed to enable the I/O device 1400. The I/O device 1400 uses the PCI Express resource space previously reserved by the virtual PCI Express device 1600, and the virtual PCI Express device 1600 is logically replaced with the hot-plugged I/O device 1400 in the PCI Express system.

By the procedure described above, hot plugging of an I/O device 1400 into the PCI Express switch 1500 is achieved using the configuration software 1000 in a PCI Express system supporting hot plugging defined by the PCI-SIG Standards provided in a conventional computer.

In the present embodiment, in case that the insertion of the I/O device 1400 occurs, it is configured that the downstream PCI-PCI bridge 1504 generates an interrupt to the CPU 1100 to notify it that the I/O device 1400 is inserted. However, the number of generating the interrupts is not necessarily limited to one. Also, as for timing of generating an interrupt, in addition to a case wherein the insertion of the I/O device 1400 is completed, the interrupt can be generated in an intermediate state (a state of an unoccupied slot) when the virtual PCI Express device 1600 is logically replaced with the hot-plugged I/O device 1400.

For instance, there is a case wherein the configuration software 1000 requests a notification of a state (a state of an unoccupied slot) in which nothing is connected to the downstream PCI-PCI bridge 1504, as an intermediate state when the virtual PCI Express device 1600 is logically replaced with the hot-plugged I/O device 1400. Such a request is sometimes needed for a case for example, wherein the configuration software 1000 does not correspond to a direct transition from a state in which the connection is made with the PCI Express device 1600 to a state in which the connection is made with the I/O device 1400. In such a case, it is convenient to configure that, when the virtual PCI Express device 1600 is removed from the downstream PCI-PCI bridge 1504, and a state of an unoccupied slot occurs, the downstream PCI-PCI bridge 1504 generates a first interrupt to the CPU 1100, and when a new I/O device 1400 is inserted into this unoccupied slot, it generates a second interrupt to the CPU.

An operation of this case is as follows: at Step 4002, the downstream PCI-PCI bridge 1504 receives a notification of the insertion of the I/O device 1400 from the hot-plugging control line 1601, and generates an interrupt of hot plugging defined by the PCI-SIG Standards to the CPU 1100 in advance, and after showing a state once in which a device is not connected under control of the downstream PCI-PCI bridge 1504 to a configuration access of the configuration software 1000, which is started by the interrupt, the operation moves to Step 4003.

Moreover, while in the present embodiment, the mode in which the PCI Express switch 1500 and virtual PCI Express device 1600 are separate devices is illustrated, it is possible to implement a mode in which the PCI Express switch 1500 comprises the virtual PCI Express device 1600.

Furthermore, while in the present embodiment, the hot-plugging control line 1601 for notification of hot-plugging is disposed, notification may be made by a PCI Express bus using a PCI Express packet.

In addition, while in the present embodiment, one of the downstream PCI-PCI bridges 1505 in the PCI Express switch 1500 is replaced by the downstream PCI-PCI bridge 1504 for handling a control signal for hot plugging, and one virtual PCI Express device 1600 is connected to the PCI Express switch 1500, it is possible to implement a mode in which a plurality of the downstream PCI-PCI bridges 1505 are replaced by the downstream PCI-PCI bridges 1504 and a plurality of virtual PCI-PCI bridge devices 1600 are connected or incorporated.

A Second Exemplary Embodiment

Figure 5:
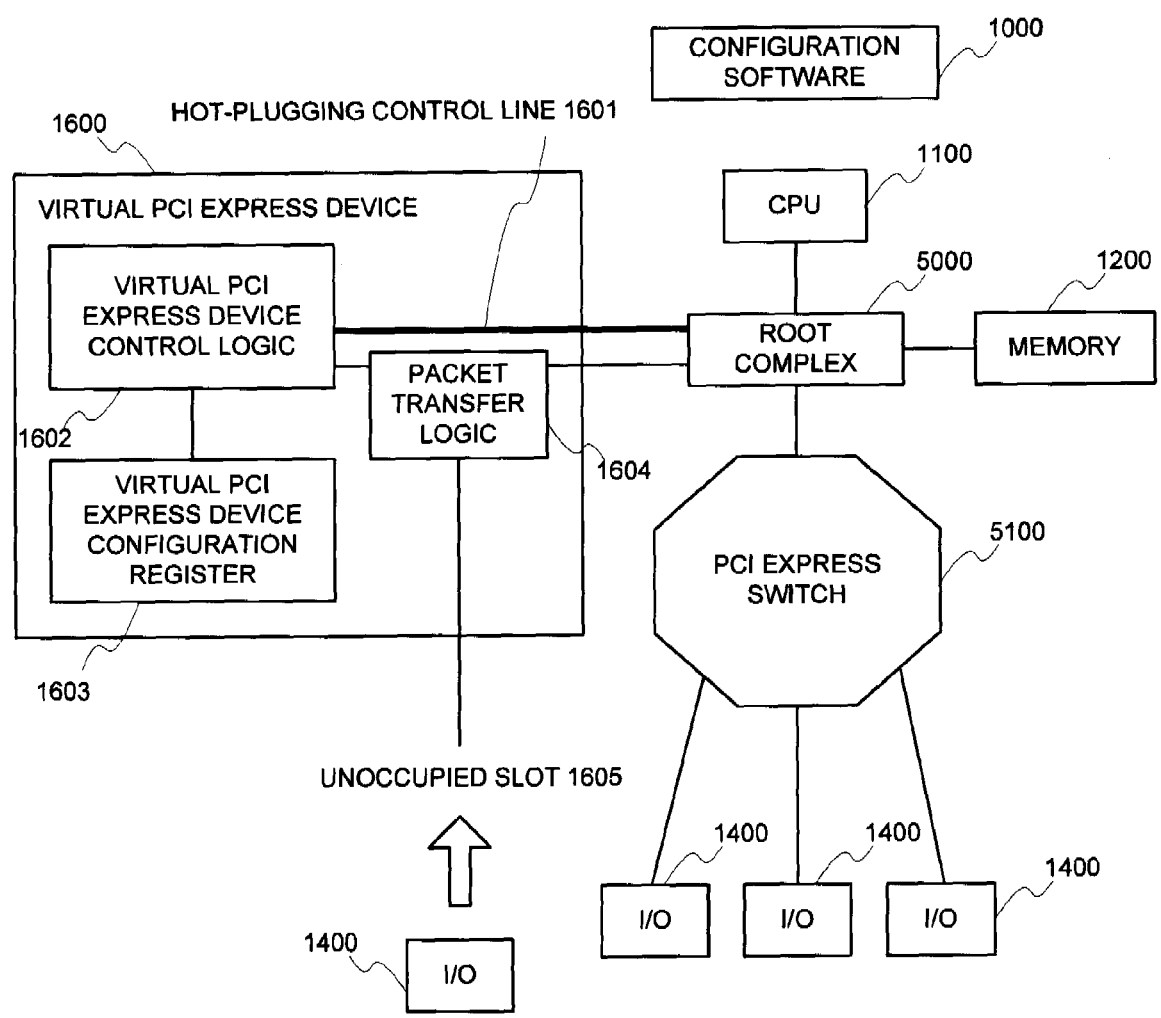
FIG. 5 is a block diagram showing an arrangement in a second embodiment of the present invention.

Referring to FIG. 5, a second embodiment of the present invention is different from the first embodiment shown in FIG. 1 in that a root complex 5000, and a PCI Express switch 5100 that is defined according to the PCI-SIG Standards are provided in place of the root complex 1300 and PCI Express switch 1500, and the virtual PCI Express device 1600 is connected to the root complex 5000, rather than to the PCI Express switch 1500.

Upon receipt of a notification that an I/O device 1400 is inserted into an unoccupied slot 1605 from the virtual PCI Express device control logic 1602 via the hot-plugging control line 1601, the root complex 5000 generates an interrupt to the CPU 1100 to notify it of insertion of the I/O device 1400.

Functionality of the other blocks is similar to that in the first embodiment, and explanations thereof will be omitted.

Next, an operation of the present embodiment will be described.

Since the operation in the PCI Express initial configuration cycle is similar to that in the first embodiment, explanations thereof will be omitted.

On the other hand, as for the operation in hot-plugging the I/O device 1400 into the unoccupied slot 1605, Steps 4002 and 4003 in the operation of the first embodiment shown in FIG. 4 are executed by the root complex 5000, rather than by the downstream PCI-PCI bridge 1504 provided in the PCI Express switch 1500. Since the operations at other steps are similar to those in the first embodiment, explanations thereof will be omitted.

By the procedure described above, hot plugging of an I/O device 1400 into the root complex 5000 is achieved using the configuration software 1000 in a PCI Express system supporting hot plugging defined by the PCI-SIG Standards provided in a conventional computer.

Moreover, while in the present embodiment, the mode in which the root complex 5000 and virtual PCI Express device 1600 are separate devices is illustrated, it is possible to implement a mode in which the root complex 5000 comprises the virtual PCI Express device 1600.

Furthermore, while in the present embodiment, the hot-plugging control line 1601 for notification of hot-plugging is disposed, notification may be made by a PCI Express bus using a PCI Express packet.

A Third Exemplary Embodiment

Figure 6:
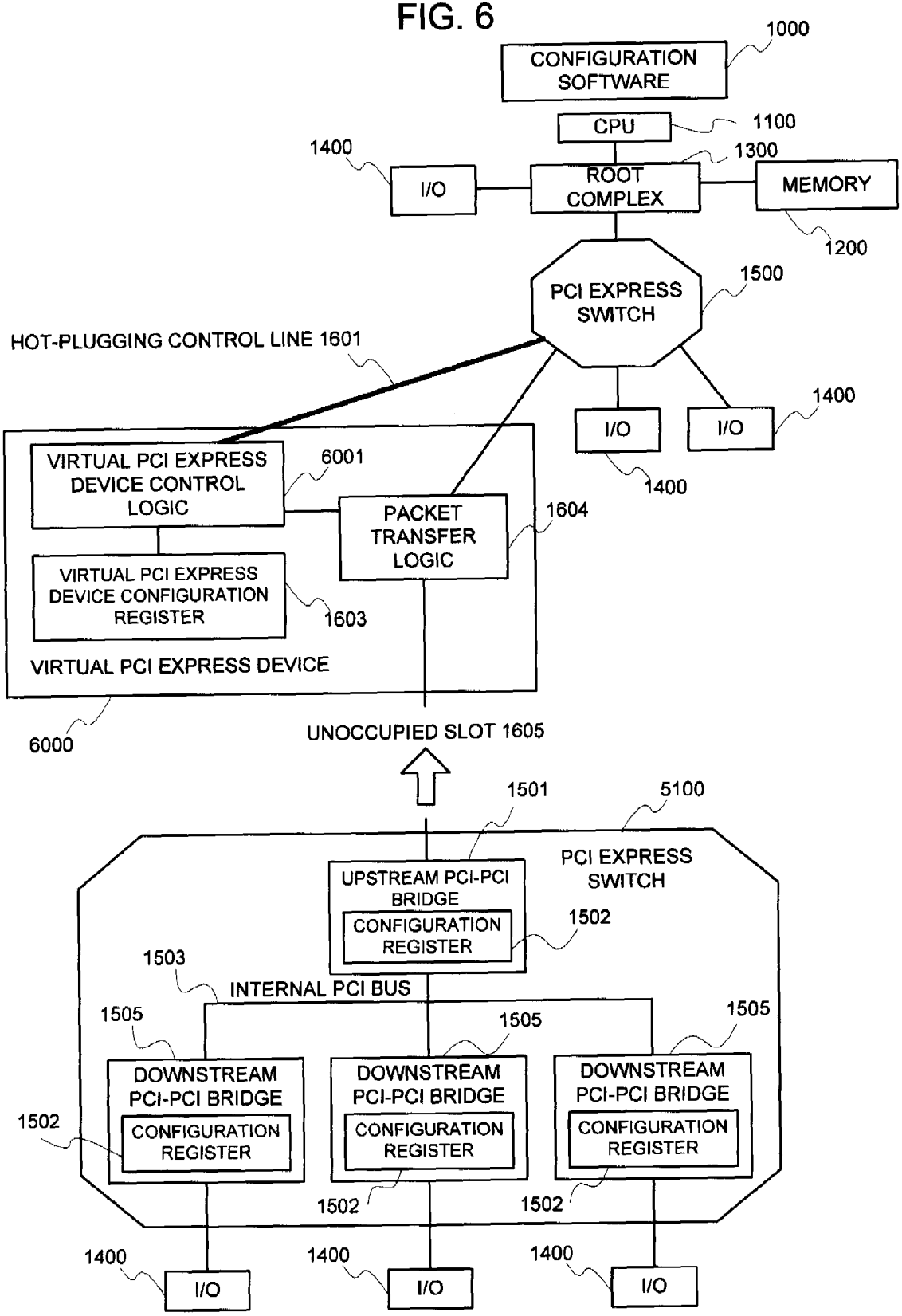
FIG. 6 is a block diagram showing an arrangement in a third embodiment of the present invention.

Referring to FIG. 6, a third embodiment of the present invention is different from the first embodiment shown in FIG. 1 in that a virtual PCI Express device 6000 comprises a virtual PCI Express device control logic 6001 in place of the virtual PCI Express device control logic 1602, and a device to be inserted into an unoccupied slot 1605 is a PCI Express switch 5100 in place of the I/O device 1400.

When the configuration software 1000 is adapted for hot plugging of the PCI Express switch 5100, the virtual PCI Express device control logic 6001 notifies the downstream PCI-PCI bridge 1504 provided in the PCI Express switch 1500 of insertion of the PCI Express switch 5100 via the hot-plugging control line 1601 when the PCI Express switch 5100 is inserted into the unoccupied slot 1605, as in the virtual PCI Express device control logic 1602 in the first embodiment shown in FIG. 1.

On the other hand, if the configuration software 1000 is not adapted for hot plugging of the PCI Express switch 5100 and merely supports hot plugging of the I/O device 1400, the virtual PCI Express device control logic 6001 configures the PCI Express switch 5100 by itself when the PCI Express switch 5100 is inserted into the unoccupied slot 1605. In particular, a previously reserved PCI Express resource space declared in the virtual PCI Express device configuration register 1603 is used to execute writing into the configuration registers 1502 provided in the upstream PCI-PCI bridge 1501 and downstream PCI-PCI bridge 1505 in the inserted PCI Express switch 5100 using a PCI Express packet, thereby configuring the PCI Express switch 5100. Upon completion of the configuration of the PCI Express switch 5100, the virtual PCI Express device control logic 6001 subsequently generates an interrupt to the CPU 1100 regarding the downstream PCI-PCI bridge 1505 connected with the I/O device 1400 provided in the inserted PCI Express switch 5100 mimicking the downstream PCI-PCI bridge 1505 to notify the CPU 1100 of insertion of the I/O device 1400. If a plurality of the downstream PCI-PCI bridges 1505 connected with I/O devices 1400 are present, the same operation is repeated for each downstream PCI-PCI bridge 1505 after waiting for completion of configuration on the I/O device 1400 activated by the interrupt.

Methods of discerning at the virtual PCI Express device control logic 6001 whether the configuration software 1000 is adapted for hot plugging of the PCI Express switch 5100 include, for example:

1) a method involving setting whether the configuration software 1000 is adapted for hot plugging of a PCI Express switch, into a control register provided in the virtual PCI Express device control logic 6001 from the configuration software 1000 by itself or from another computer connected to the logic 6001 via a separate cable; and 2) a method involving toggling the status of a physical switch provided in the virtual PCI Express device control logic 6001 according to whether the configuration software 1000 is adapted for hot plugging of a PCI Express switch.

The virtual PCI Express device configuration register 1603 reserves a PCI Express resource space sufficient for hot plugging of the PCI Express switch 5100 and the plurality of I/O devices 1400 connected to the PCI Express switch 5100 in the PCI Express initial configuration cycle.

Next, the operation of the present embodiment will be described in detail with reference to the accompanying drawings.

Since the operation in the PCI Express initial configuration cycle is similar to that in the first embodiment shown in FIG. 3, explanations thereof will be omitted.

On the other hand, the operation in hot-plugging the PCI Express switch 5100 into the unoccupied slot 1605 is different, if the configuration software 1000 is adapted for hot plugging of the PCI Express switch 5100, in that at Step 4004 in the first embodiment shown in FIG. 4, the configuration software 1000 configures the PCI Express switch 5100 inserted into the unoccupied slot 1605 in place of the I/O device 1400, and all I/O devices 1400. Since the operations at other steps are similar, explanations thereof will be omitted.

Next, an operation in which the configuration software 1000 is not adapted for hot plugging of the PCI Express switch 5100 and merely supports hot plugging of an I/O device 1400 will be described with reference to FIG. 6 and a flow chart shown in FIG. 7.

Figure 7:
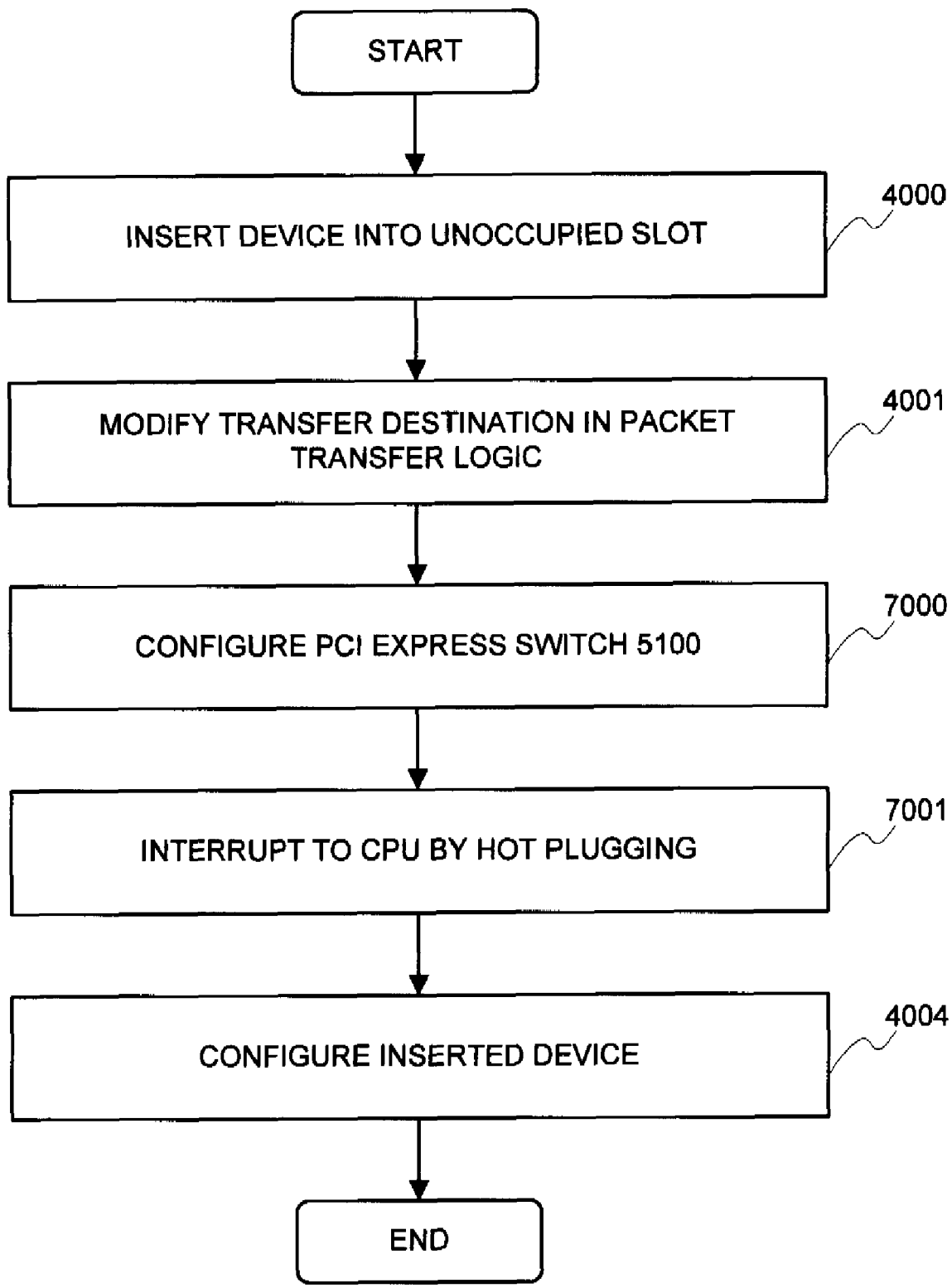
FIG. 7 is a flow chart showing an operation in hot plugging in the third embodiment of the present invention.

Referring to FIG. 7, the operation in accordance with the present embodiment is different from the first embodiment shown in FIG. 4 in that Step 7000 (configuration of the PCI Express switch 5100) is included in place of Step 4002 (notification of insertion of the I/O device 1400 to the downstream PCI-PCI bridge 1504), and Step 7001 (interrupt for hot plugging to the CPU) is included in place of Step 4003 (interrupt for hot plugging to the CPU).

Since Steps 4000 and 4001 are similar to those in the first embodiment shown in FIG. 4, explanations thereof will be omitted. When the PCI Express switch 5100 is inserted into the unoccupied slot 1605, the virtual PCI Express device control logic 6001 uses a previously reserved PCI Express resource space declared in the virtual PCI Express device configuration register 1603 to execute writing into the configuration registers 1502 provided in the upstream PCI-PCI bridge 1501 and downstream PCI-PCI bridge 1505 in the inserted PCI Express switch 5100 using a PCI Express packet, thereby configuring the PCI Express switch 5100 (Step 7000).

Subsequently, the virtual PCI Express device control logic 6001 generates an interrupt to the CPU 1100 regarding the downstream PCI-PCI bridge 1505 connected with the I/O device 1400 provided in the inserted PCI Express switch 5100 mimicking the downstream PCI-PCI bridge 1505 to notify the CPU 1100 of insertion of the I/O device 1400 (Step 7001). Triggered by the interrupt, the configuration software 1000 configures the I/O device 1400 connected to the downstream PCI-PCI bridge 1505 (Step 4004). If a plurality of the downstream PCI-PCI bridges 1505 connected with I/O devices 1400 are present, the same operation is repeated for each downstream PCI-PCI bridge 1505 after waiting for completion of configuration on the I/O device 1400 activated by the interrupt, thus configuring all the I/O devices 1400 connected to the PCI Express switch 5100. At that time, Steps 7001 and 4004 are executed in conformance with the procedure for hot plugging defined by the PCI-SIG Standards.

By the procedure described above, hot plugging of a PCI Express switch 5100 into the PCI Express switch 1500 is achieved using the configuration software 1000 in a PCI Express system supporting hot plugging defined by the PCI-SIG Standards provided in a conventional computer; and moreover, hot plugging of the PCI Express switch 5100 into the PCI Express switch 1500 is achieved even if the configuration software 1000 merely supports hot plugging of an I/O device 1400 among hot plugging defined by the PCI-SIG Standards.

Moreover, while in the present embodiment, the mode in which the PCI Express switch 1500 and virtual PCI Express device 6000 are separate devices is illustrated, it is possible to implement a mode in which the PCI Express switch 1500 comprises the virtual PCI Express 6000.

Furthermore, while in the present embodiment, the hot-plugging control line 1601 for notification of hot-plugging is disposed, notification may be made by a PCI Express bus using a PCI Express packet.

In addition, while in the present embodiment, the one-stage PCI Express switch 5100 to be inserted into the unoccupied slot 1605 is shown, it is possible to provide a multi-stage arrangement of the PCI Express switches 5100 in which the most upstream PCI Express switch 5100 is hot-plugged into the unoccupied slot 1605. In such an arrangement, an operation in which the configuration software 1000 supports hot plugging defined by the PCI-SIG Standards is similar to that in which the aforementioned one PCI Express switch 5100 is inserted into the unoccupied slot 1605. On the other hand, if the configuration software 1000 merely supports hot plugging of an I/O device 1400 among hot plugging defined by the PCI-SIG Standards, all the inserted PCI Express switches 5100 are configured according to Step 7000 shown in FIG. 7, and the operations involving generation of an interrupt to the CPU (Step 7001) and configuration by the configuration software 1000 are performed on each of all the I/O devices 1400 connected to the PCI Express switches 5100 (Step 4004).

A Fourth Exemplary Embodiment

Figure 8:
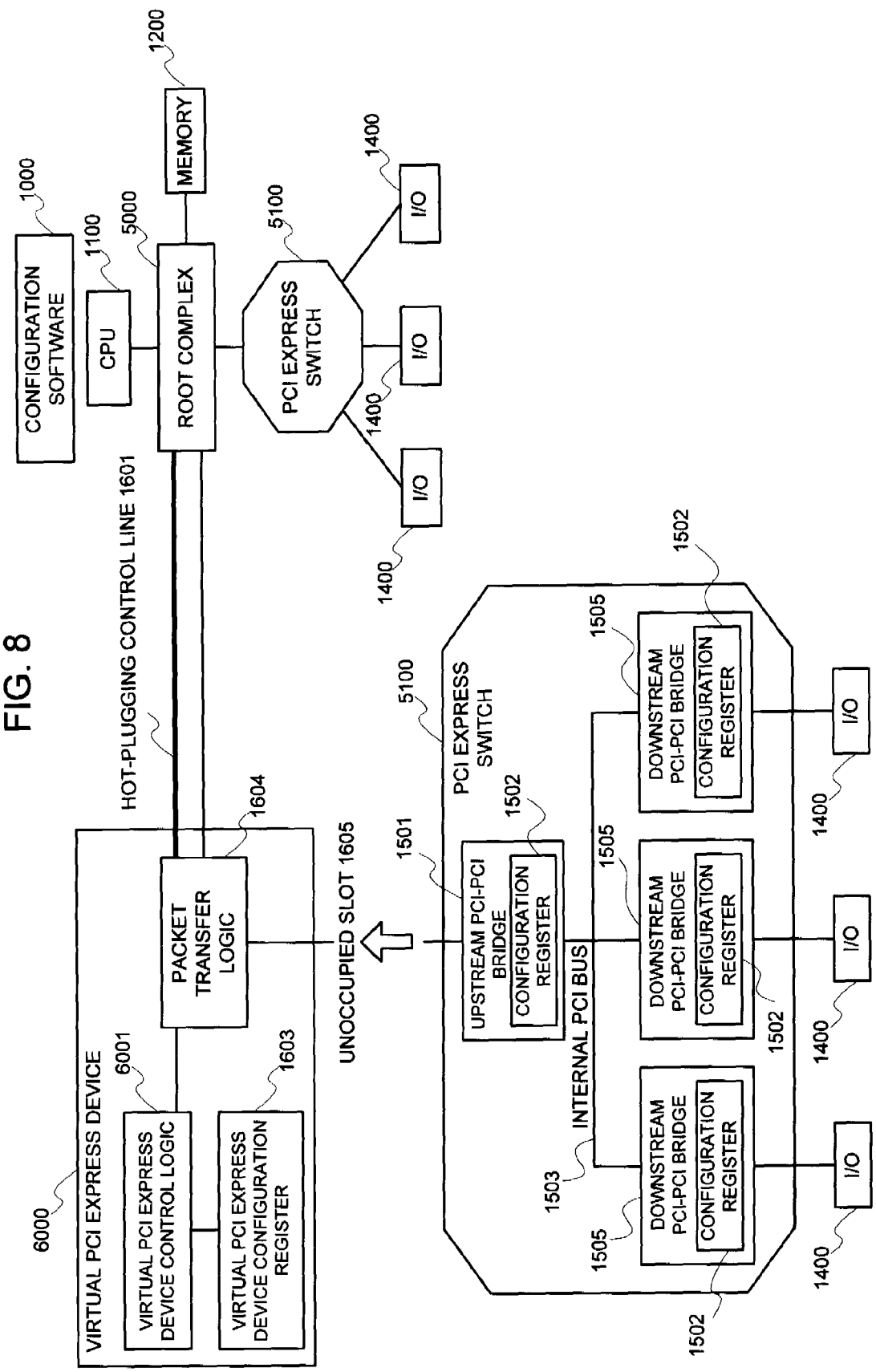
FIG. 8 is a block diagram showing an arrangement in a fourth embodiment of the present invention.

Referring to FIG. 8, a fourth embodiment of the present invention is different from the second embodiment shown in FIG. 5 in that a virtual PCI Express device 6000 is included in place of the virtual PCI Express device 1600, and a PCI Express device to be hot-plugged into the unoccupied slot 1605 is a PCI Express switch 5100 in place of the I/O device 1400. Moreover, the virtual PCI Express device 6000 is different from the virtual PCI Express device 1600 in that a virtual PCI Express device control logic 6001 similar to that in the third embodiment is included in place of the virtual PCI Express device control logic 1602.

Next, the operation of the present embodiment will be described.

Since the operation in the PCI Express initial configuration cycle is similar to that in the first embodiment shown in FIG. 3, explanations thereof will be omitted.

On the other hand, the operation in hot-plugging the PCI Express switch 5100 into the unoccupied slot 1605 is different, if the configuration software 1000 is adapted for hot plugging of the PCI Express switch 5100, in that at Step 4004 in the first embodiment shown in FIG. 4, the inserted PCI Express switch 5100 and all I/O devices 1400 are configured, instead of the I/O device 1400. Since the operations at other steps are similar, explanations thereof will be omitted.

Moreover, since the operation in which the configuration software 1000 is not adapted for hot plugging of the PCI Express switch 5100 and merely supports hot plugging of the I/O device 1400 is similar to that in the third embodiment shown in FIG. 7, explanations thereof will be omitted.

By the procedure described above, hot plugging of a PCI Express switch 5100 into the root complex 5000 is achieved using the configuration software 1000 in a PCI Express system supporting hot plugging defined by the PCI-SIG Standards provided in a conventional computer; and moreover, hot plugging of a PCI Express switch 5100 into the root complex 5000 is achieved even if the configuration software 1000 merely supports hot plugging of an I/O device 1400 among hot plugging defined by the PCI-SIG Standards.

While in the present embodiment, the mode in which the root complex 5000 and virtual PCI Express device 6000 are separate devices is illustrated, it is possible to implement a mode in which the root complex 5000 comprises the virtual PCI Express device 6000.

Moreover, while in the present embodiment, the hot-plugging control line 1601 for notification of hot-plugging is disposed, notification may be made by a PCI Express bus using a PCI Express packet.

Furthermore, while in the present embodiment, the one-stage PCI Express switch 5100 to be inserted into the unoccupied slot 1605 is shown, the most upstream one of multistage PCI Express switches 5100 may be hot-plugged into the unoccupied slot 1605 according to a similar operation to that in the third embodiment.

A Fifth Exemplary Embodiment

Figure 9:
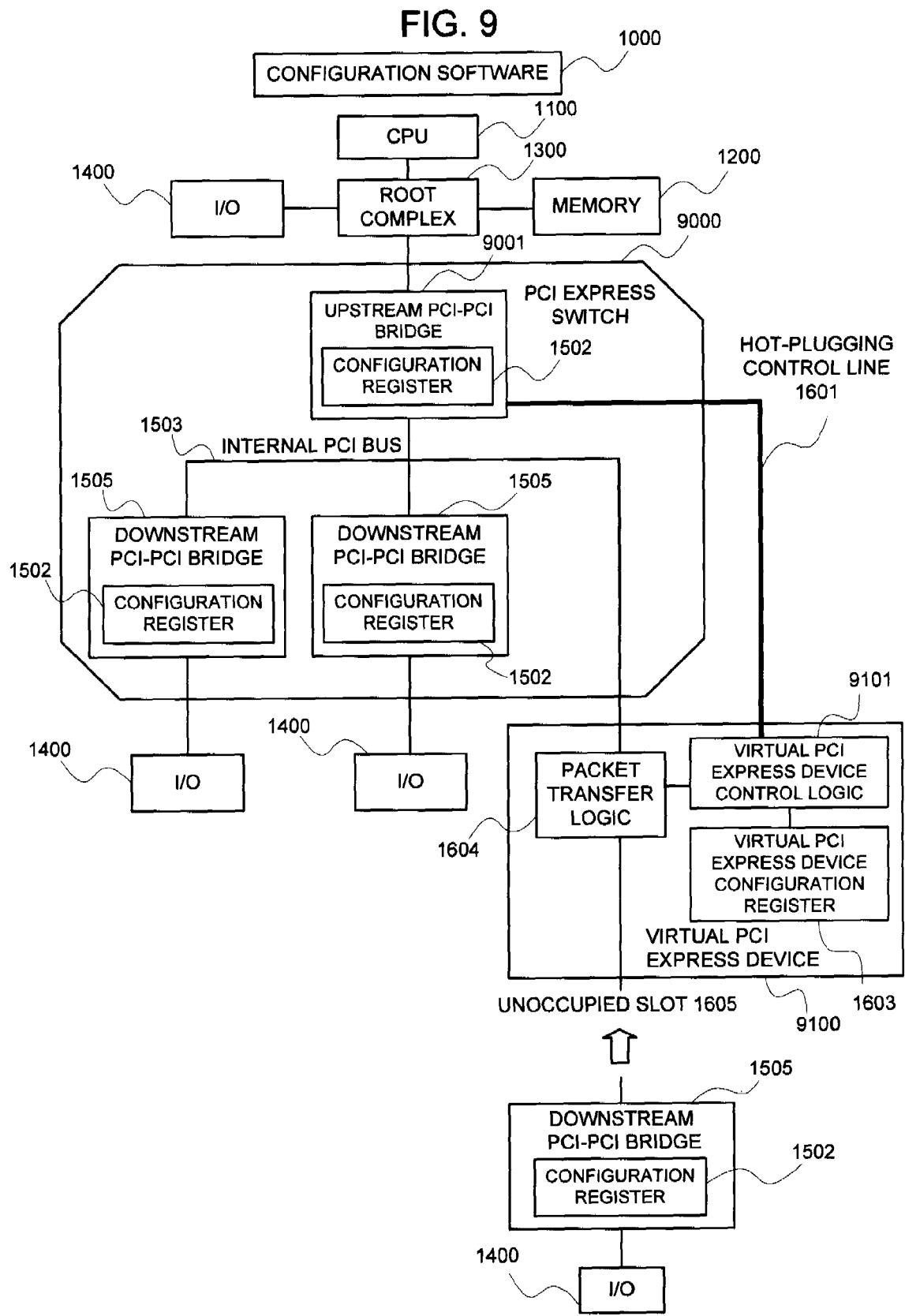
FIG. 9 is a block diagram showing an arrangement in a fifth embodiment of the present invention.

Referring to FIG. 9, a fifth embodiment of the present invention is different from the first embodiment shown in FIG. 1 in that a PCI Express switch 9000 is included in place of the PCI Express switch 1500, a virtual PCI Express device 9100 is included in place of the virtual PCI Express device 1600, and a device to be inserted into the unoccupied slot 1605 is a downstream PCI-PCI bridge 1505 in place of the I/O device 1400. Moreover, the PCI Express switch 9000 is different from the PCI Express switch 1500 in that an upstream PCI-PCI bridge 9001 connected to the hot-plugging control line 1601 is included in place of the upstream PCI-PCI bridge 1501.

Upon notification of insertion of the downstream PCI-PCI bridge 1505 into the unoccupied slot 1605 received from the hot-plugging control line 1601, the upstream PCI-PCI bridge 9001 generates an interrupt to the CPU 1100 to notify it of insertion of the downstream PCI-PCI bridge 1505.

When the configuration software 1000 is adapted for hot plugging of the downstream PCI-PCI bridge 1505, the upstream PCI-PCI bridge 9001 provided in the PCI Express switch 9000 of insertion of the downstream PCI-PCI bridge 1505 into the unoccupied slot 1605 via the hot-plugging control line 1601 when the downstream PCI-PCI bridge 1505 is inserted into the unoccupied slot 1605. On the other hand, if the configuration software 1000 is not adapted for hot plugging of the downstream PCI-PCI bridge 1505 and merely supports hot plugging of the I/O device 1400, the virtual PCI Express device control logic 9101 configures the downstream PCI-PCI bridge 1505 when the downstream PCI-PCI bridge 1505 is inserted into the unoccupied slot 1605, by using a previously reserved PCI Express resource space declared in the virtual PCI Express device configuration register 1603 to execute writing into the configuration registers 1502 provided in the inserted downstream PCI-PCI bridge 1505 using a PCI Express packet. If the inserted downstream PCI-PCI bridge 1505 is connected with an I/O device 1400, an interrupt is subsequently generated to the CPU 1100 to notify it of insertion of the I/O device 1400 mimicking the downstream PCI-PCI bridge 1505.

The virtual PCI Express device configuration register 1603 reserves a PCI Express resource space sufficient for hot plugging of the downstream PCI-PCI bridge 1505 and I/O device 1400 connected to the downstream PCI-PCI bridge 1505 in the PCI Express initial configuration cycle.

Next, the operation of the present embodiment will be described in detail with reference to the accompanying drawings.

Since the operation in the PCI Express initial configuration cycle is similar to that in the first embodiment shown in FIG. 3, explanations thereof will be omitted.

On the other hand, the operation in hot-plugging the downstream PCI-PCI bridge 1505 into the unoccupied slot 1605 is different, if the configuration software 1000 is adapted for hot plugging of the downstream PCI-PCI bridge 1505, in that at Step 4004 in the operation of the first embodiment shown in FIG. 4, the configuration software 1000 configures the inserted downstream PCI-PCI bridge 1505 and I/O device 1400 in place of the I/O device 1400. Since the operations at other steps are similar, explanations thereof will be omitted.

Next, an operation in which the configuration software 1000 is not adapted for hot plugging of the downstream PCI-PCI bridge 1505 and merely supports hot plugging of the I/O device 1400 will be described with reference to FIG. 9 and a flow chart shown in FIG. 10.

Figure 10:
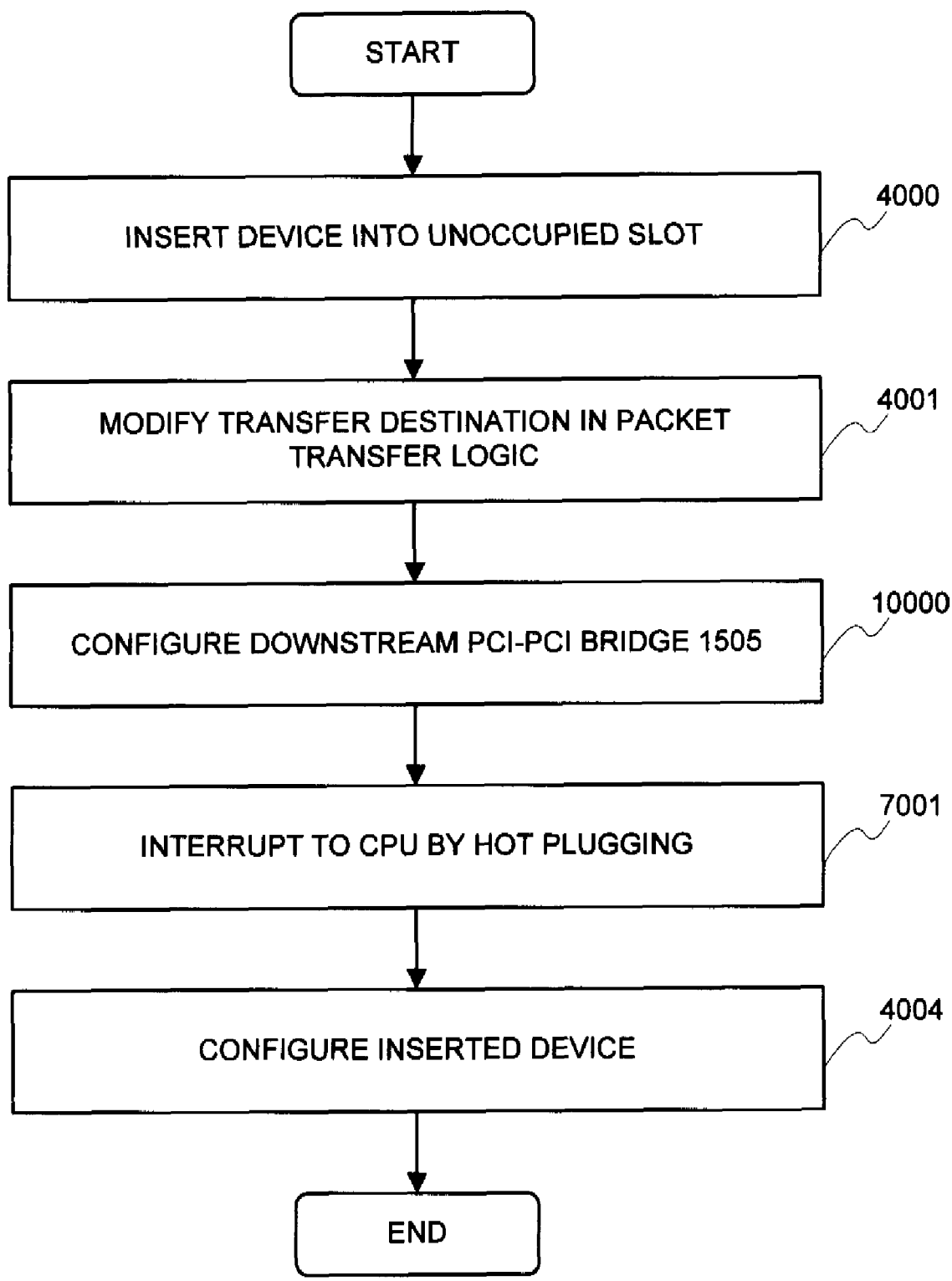
FIG. 10 is a flow chart showing an operation in hot plugging in the fifth embodiment of the present invention.

Referring to FIG. 10, the operation in which the configuration software 1000 is not adapted for hot plugging of the downstream PCI-PCI bridge 1505 and merely supports hot plugging of the I/O device 1400 is different from that in the third embodiment shown in FIG. 7 in that Step 10000 (configuration of the downstream PCI-PCI bridge 1505) is included in place of Step 7000 (configuration of the PCI Express switch 5100).

Since Steps 4000 and 4001 are similar to those in the first embodiment shown in FIG. 4, explanations thereof will be omitted. When the downstream PCI-PCI bridge 1505 is inserted into the unoccupied slot 1605, the virtual PCI Express device control logic 9101 configures the downstream PCI-PCI bridge 1505 by using a previously reserved PCI Express resource space declared in the virtual PCI Express device configuration register 1603 to execute writing into the configuration register 1502 provided in the inserted downstream PCI-PCI bridge 1505 using a PCI Express packet (Step 10000). If the inserted downstream PCI-PCI bridge 1505 is connected with an I/O device 1400, an interrupt is subsequently generated to the CPU 1100 to notify it of insertion of the I/O device 1400 mimicking the downstream PCI-PCI bridge 1505 (Step 7001). Triggered by the interrupt, the configuration software 1000 configures the I/O device 1400 connected to the inserted downstream PCI-PCI bridge 1505 (Step 4004).

By the procedure described above, hot plugging of a downstream PCI-PCI bridge 1505 into the upstream PCI-PCI bridge 9001 is achieved using the configuration software 1000 in a PCI Express system supporting hot plugging defined by the PCI-SIG Standards provided in a conventional computer; and moreover, hot plugging of the downstream PCI-PCI bridge 1505 into the upstream PCI-PCI bridge 9001 is achieved even if the configuration software 1000 merely supports hot plugging of an I/O device 1400 among hot plugging defined by the PCI-SIG Standards.

Moreover, while in the present embodiment, the mode in which the PCI Express switch 9000 and virtual PCI Express device 9100 are separate devices is illustrated, it is possible to implement a mode in which the PCI Express switch 9000 comprises the virtual PCI Express device 9100.

Furthermore, while in the present embodiment, the hot-plugging control line 1601 for notification of hot-plugging is disposed, notification may be made by a PCI Express bus using a PCI Express packet.

In addition, while in the present embodiment, a case in which the downstream PCI-PCI bridge 1505 to be inserted in the unoccupied slot 1605 is connected with one I/O device 1400 is shown, it is possible to provide an arrangement comprising one stage or more of PCI Express switches 5100 between them. In such an arrangement, the operation in which the configuration software 1000 supports hot plugging defined by the PCI-SIG Standards is similar to that in which the configuration software 1000 is adapted for hot plugging of the downstream PCI-PCI bridge 1505 except that the configuration software 1000 configures all inserted devices, triggered by an interrupt to the CPU 1100. On the other hand, if the configuration software 1000 merely supports hot plugging of an I/O device 1400 among hot plugging defined by the PCI-SIG Standards, the operation is similar to that in which the configuration software 1000 shown in FIG. 10 does not support hot plugging of the downstream PCI-PCI bridge 1505 except that at Step 10000, the virtual PCI Express device control logic 9101 configures the inserted downstream PCI-PCI bridge 1505, and in addition to that, configures all PCI Express switches 5100 connected downstream of the downstream PCI-PCI bridge 1505, and performs the operations involving generating an interrupt to the CPU (Step 7001) and configuring the all I/O device 1400 connected to the PCI Express switch 5100 (Step 4004) on each of all the I/O devices 1400 connected to the PCI Express switches 5100.

While the descriptions of the first-fifth embodiments are directed to a PCI Express system, it will be easily recognized to those skilled in the art that the technique of reserving a resource space and achieving hot plugging of a device with respect to the reserved resource space in a similar way may be applied to PCI and PCI-X defined earlier than PCI Express, to next standards of PCI Express that will be defined in the future, and moreover, to other bus standards.

EXAMPLE 1

Next, a first example of the present invention will be described with reference to FIG. 11. The example corresponds to the first embodiment of the present invention.

Figure 11:
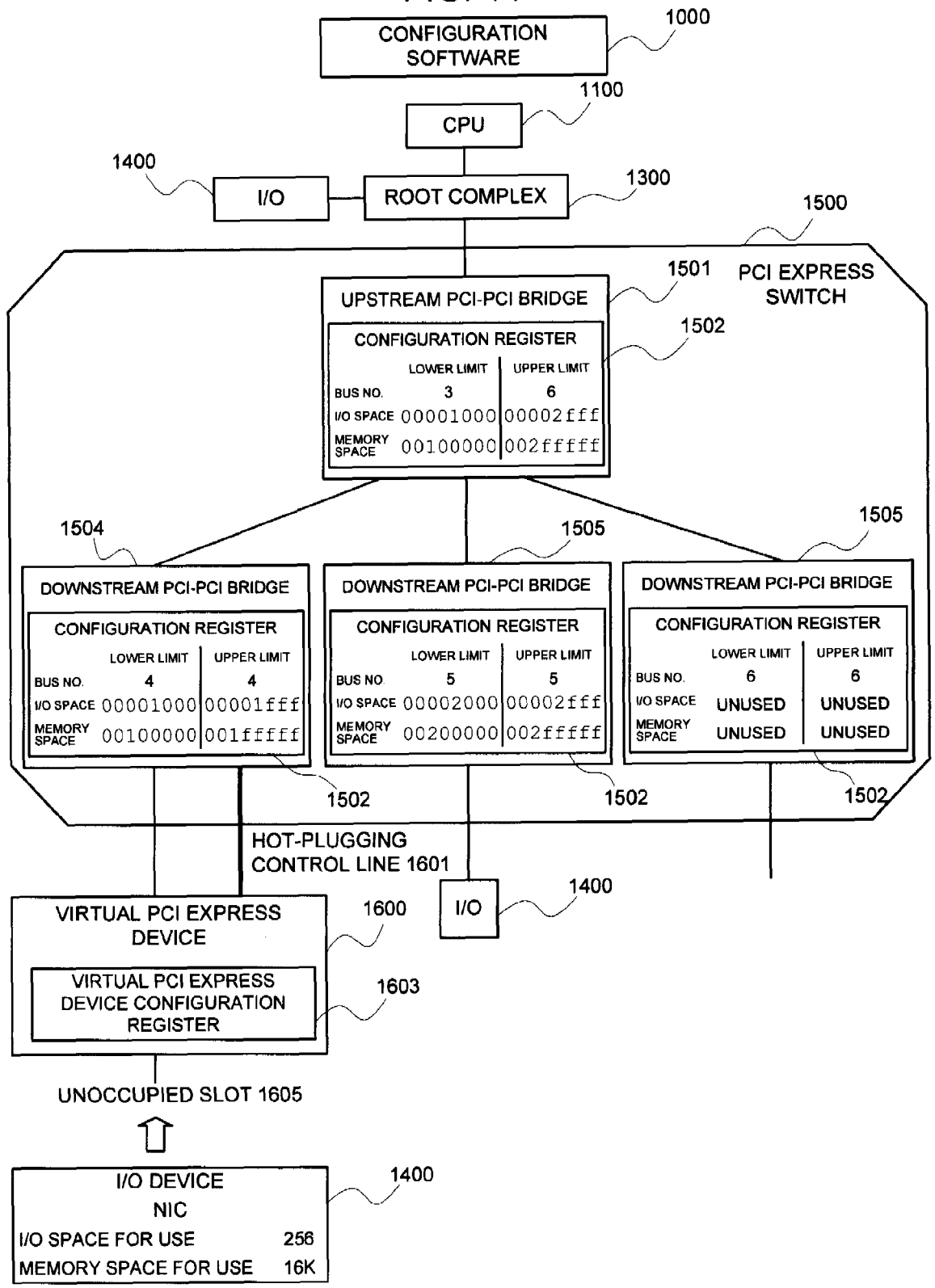
FIG. 11 is a block diagram of a first example of the present invention.

Referring to FIG. 11, the present example employs a network interface card (NIC) as the I/O device 1400 to be hot-plugged. The NIC requires 256 of a 32-bit I/O space to be used, and 16K of a 32-bit memory space.

The virtual PCI Express device 1600 uses the virtual PCI Express device configuration register 1603 to indicate the presence of a virtual I/O device 1400 to a PCI Express initial configuration cycle, and reserves 4K of the I/O space and 1M of the memory space. In particular, the virtual PCI Express device configuration register 1603 holds one configuration register of Type 0 whose device ID, vendor ID and class code are used to indicate the presence of the I/O device 1400, and base address register is used to request 4K of the I/O space and 1M of the memory space. In spite of the fact that the spaces requested by the NIC are 256 of the 32-bit I/O space and 16K of the 32-bit memory space, 4K of the I/O space and 1M of the memory space are reserved; this is because common configuration software 1000 that is currently used is set by default to reserve 4K of the I/O space and 1M of the memory space when a certain I/O device is connected to the downstream PCI-PCI bridge.

Since the virtual PCI Express device 1600 reserves 4K of the I/O space and 1M of the memory space as described above, the configuration register 1502 provided in the downstream PCI-PCI bridge 1504 that the virtual PCI Express device 1600 connects is set such that an I/O space 00001000-00001fff and a memory space 00100000-001fffff are connected downstream of the bridge 1504 itself, and is set with a bus number of 4, in the PCI Express initial configuration cycle.

One of the two remaining downstream PCI-PCI bridges 1505 included in the PCI Express switch 1500 is connected with an I/O device 1400, which uses a bus number of 5, an I/O space 00002000-00002fff, and a memory space 00200000-002fffff. The other downstream PCI-PCI bridge 1505 is not connected with any device.

The configuration register 1502 provided in the upstream PCI-PCI bridge 1501 retains information on the upstream PCI-PCI bridge 1501. Hence, in the present example, bus numbers of 3-6, 32-bit I/O space 00001000-00002fff, and 32-bit memory space 00100000-002fffff are set to be connected downstream of the upstream PCI-PCI bridge 1501.

When hot-plugging the NIC, the virtual PCI Express device 1600 uses the hot-plugging control line 1601 to notify the downstream PCI-PCI bridge 1504, which in turn generates an interrupt to the CPU 1100, whereby the configuration software 1000 is invoked to configure the NIC. This configuration is all executed in conformance with the procedure for hot plugging defined by the PCI-SIG Standards. At that time, 256 of the 32-bit I/O space and 16K of the 32-bit memory space requested by the NIC are contained within the PCI Express resource space reserved beforehand by the virtual PCI Express device 1600. Thus, the values in the configuration registers 1502 held by the upstream PCI-PCI bridge 1501 and downstream PCI-PCI bridges 1504 and 1505 are maintained and configuration is made solely on the NIC, so that services provided by other I/O devices 1400 are continued.

EXAMPLE 2

Next, a second example of the present invention will be described with reference to FIG. 12. The example corresponds to the second embodiment of the present invention.

Figure 12:
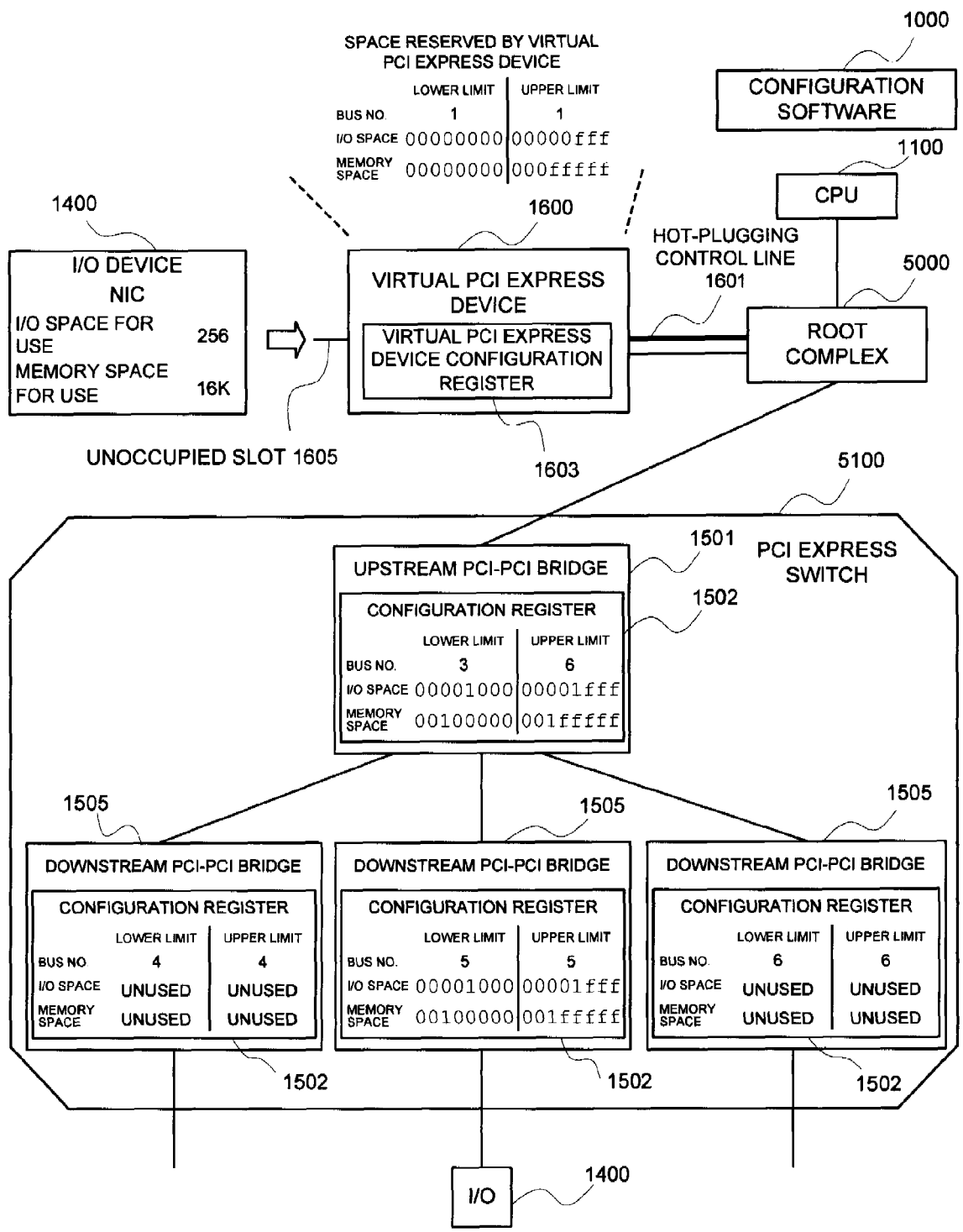
FIG. 12 is a block diagram of a second example of the present invention.

Referring to FIG. 12, the present example is different from the first example in that the NIC is hot-plugged into a root complex 5000.

The virtual PCI Express device 1600 uses the device ID, vendor Id and class code provided in the virtual PCI Express device configuration register 1603 to virtually indicate the presence of an I/O device to the PCI Express initial configuration cycle, and uses the base address register to reserve 4K of the 32-bit I/O space and 1M of the 32-bit memory space downstream of the root complex 5000.

When hot-plugging the NIC, the virtual PCI Express device 1600 uses the hot-plugging control line 1601 to notify the root complex 5000, which in turn generates an interrupt to the CPU 1100, whereby the configuration software 1000 is invoked to configure the NIC. This configuration is all executed in conformance with the procedure for hot plugging defined by the PCI-SIG Standards. At that time, configuration is made solely on the NIC and services provided by other I/O devices 1400 are continued, as in the first embodiment.

EXAMPLE 3

Next, a third example of the present invention will be described with reference to FIG. 13. The example corresponds to the third embodiment of the present invention.

Figure 13:
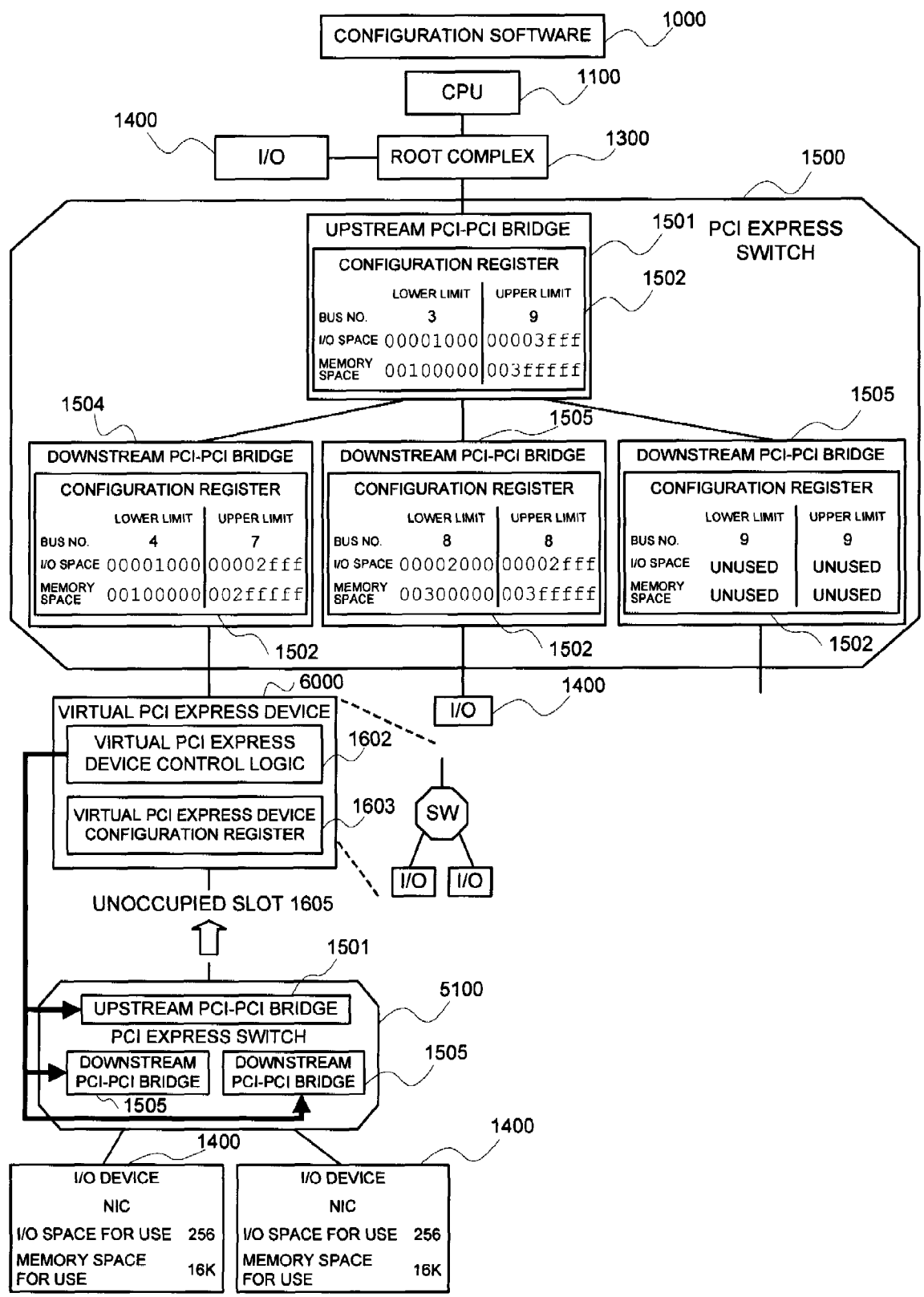
FIG. 13 is a block diagram of a third example of the present invention.

Referring to FIG. 13, the present example is different from the first example in that a PCI Express switch 5100 is hot-plugged into the PCI Express switch 1500. In this example, it is assumed that two NIC's are connected to the PCI Express 5100 to be hot-plugged.

The virtual PCI Express device 6000 uses the virtual PCI Express device configuration register 1603 to indicate the presence of one virtual PCI Express switch 5100 and two I/O devices 1400 to the PCI Express initial configuration cycle, and reserves four bus numbers, 8K of the I/O space and 2M of the memory space. In particular, the virtual PCI Express device configuration register 1603 holds three configuration registers of Type 1 to mimic one PCI Express switch comprising one upstream PCI-PCI bridge and two downstream PCI-PCI bridges, and two configuration registers of Type 0 to mimic two I/O devices connected to the PCI Express switch, and also retains topology information representing the topology of two I/O devices connected to the PCI Express switch.

Based on the topology information, the virtual PCI Express device control logic 1602 performs a write and read operation on each register according to the contents of a packet related to a configuration access received from the configuration software 1000, causing the configuration software 1000 to recognize the topology of the virtual device arrangement.

Since the virtual PCI Express device 6000 reserves the PCI Express resource space as described above, the configuration register 1502 provided in the downstream PCI-PCI bridge 1504 indicates the bus numbers 4-7, I/O space 00001000-00002fff, and memory space 00100000-002fffff connected downstream of the downstream PCI-PCI bridge 1504.

In this example, the configuration software 1000 is assumed not to be adapted for hot plugging of the PCI Express switch 5100.

When hot-plugging the PCI Express switch 5100 into the unoccupied slot 1605, the virtual PCI Express device control logic 1602 copies the values in the virtual PCI Express device configuration register 1603 to the configuration registers 1502 provided in the upstream PCI-PCI bridge 1501 and downstream PCI-PCI bridges 1505 of the PCI Express switch 5100 that is hot-plugged, thereby configuring the inserted PCI Express switch 5100. Since the virtual PCI Express device configuration register 1603 holds a register corresponding to the PCI Express switch 5100, the corresponding portion can be directly copied. In particular, the contents of the configuration register of Type 1 mimicking the upstream PCI-PCI bridge, which contents are retained by the virtual PCI Express device configuration register 1603, are copied to the configuration register 1502 in the upstream PCI-PCI bridge 1501, and the contents of the configuration register of Type 1 mimicking the downstream PCI-PCI bridge, which contents are retained by the virtual PCI Express device configuration register 1603, are copied to the configuration registers 1502 in the two downstream PCI-PCI bridges 1505.

Subsequently, the virtual PCI Express device control logic 1602 generates an interrupt to the CPU 1100 to notify it of insertion of the NIC mimicking the downstream PCI-PCI bridge 1505 included in the PCI Express switch 5100. Upon the interrupt, the configuration software 1000 is invoked to configure the NIC connected to the interrupting downstream PCI-PCI bridge 1505. This configuration on the NIC is all executed in conformance with the procedure for hot plugging defined by the PCI-SIG Standards. Since in this arrangement, the inserted PCI Express switch 5100 is connected with two NIC's, the operation in response to hot plugging of the I/O device 1400 defined by the PCI-SIG Standards is repeatedly performed on the two NIC's. The configuration described above is all executed solely on the inserted PCI Express switch 5100 and NIC's, and services provided by other I/O devices 1400 are continued, as in the first embodiment.

EXAMPLE 4

Next, a fourth example of the present invention will be described with reference to FIG. 14. The example corresponds to the fourth embodiment of the present invention.

Figure 14:
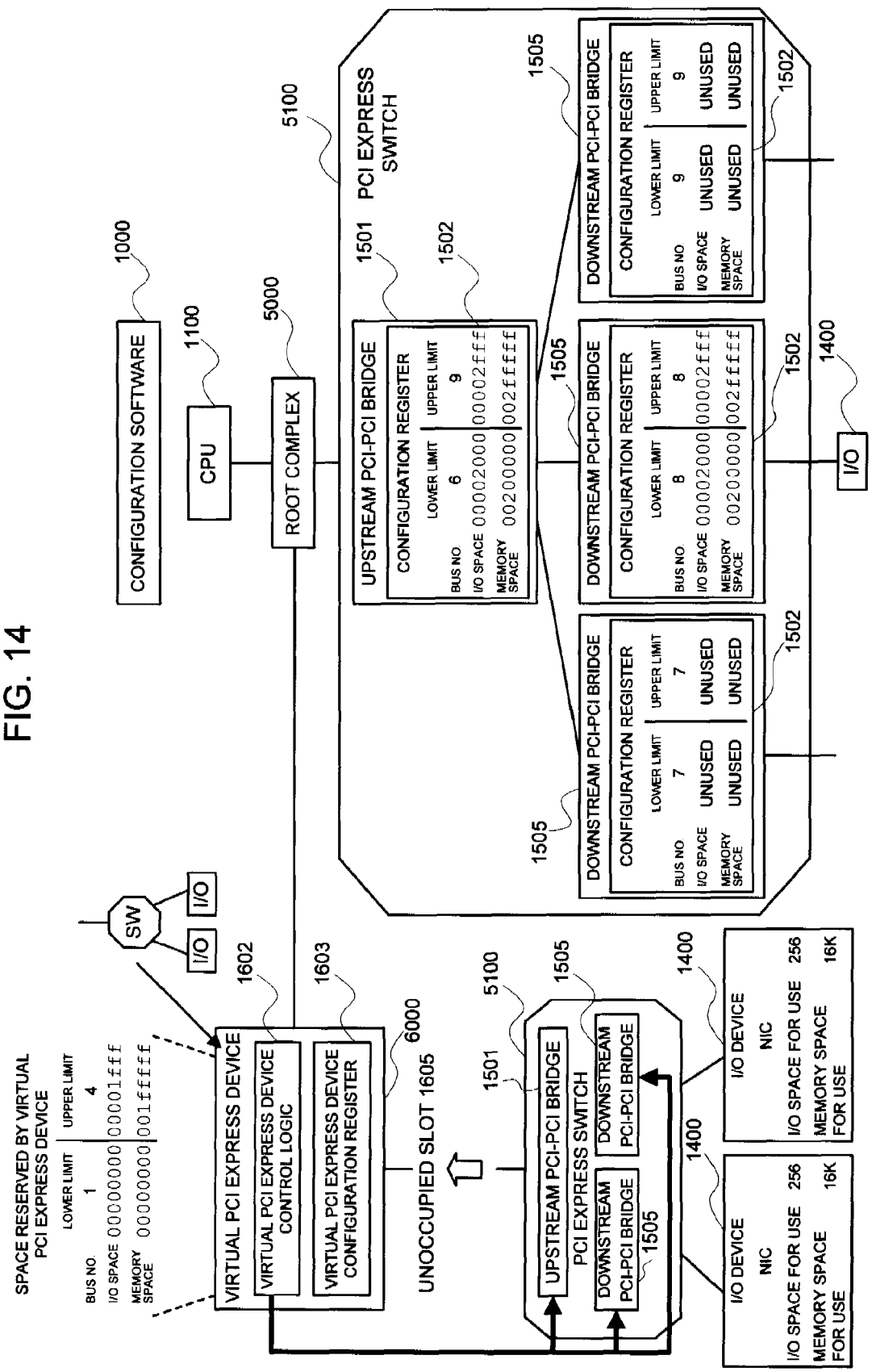
FIG. 14 is a block diagram of a fourth example of the present invention.

Referring to FIG. 14, the present example is different from the second example in that a PCI Express switch 5100 is hot-plugged into the root complex 5000. In this example, it is assumed that two NIC's are connected to the PCI Express 5100 to be hot-plugged, as in the third example.

The virtual PCI Express device 6000 indicates the presence of the one virtual PCI Express switch 5100 and two I/O devices 1400 by the virtual PCI Express device configuration register 1603 to the PCI Express initial configuration cycle, and reserves four bus numbers, 8K of the I/O space and 2M of the memory space downstream of the root complex 5000.

Since the operation in hot-plugging the PCI Express switch 5100 is similar to that in the third example, explanations thereof will be omitted.

EXAMPLE 5

Next, a fifth example of the present invention will be described with reference to FIG. 15. The example corresponds to the fifth embodiment of the present invention.

Figure 15:
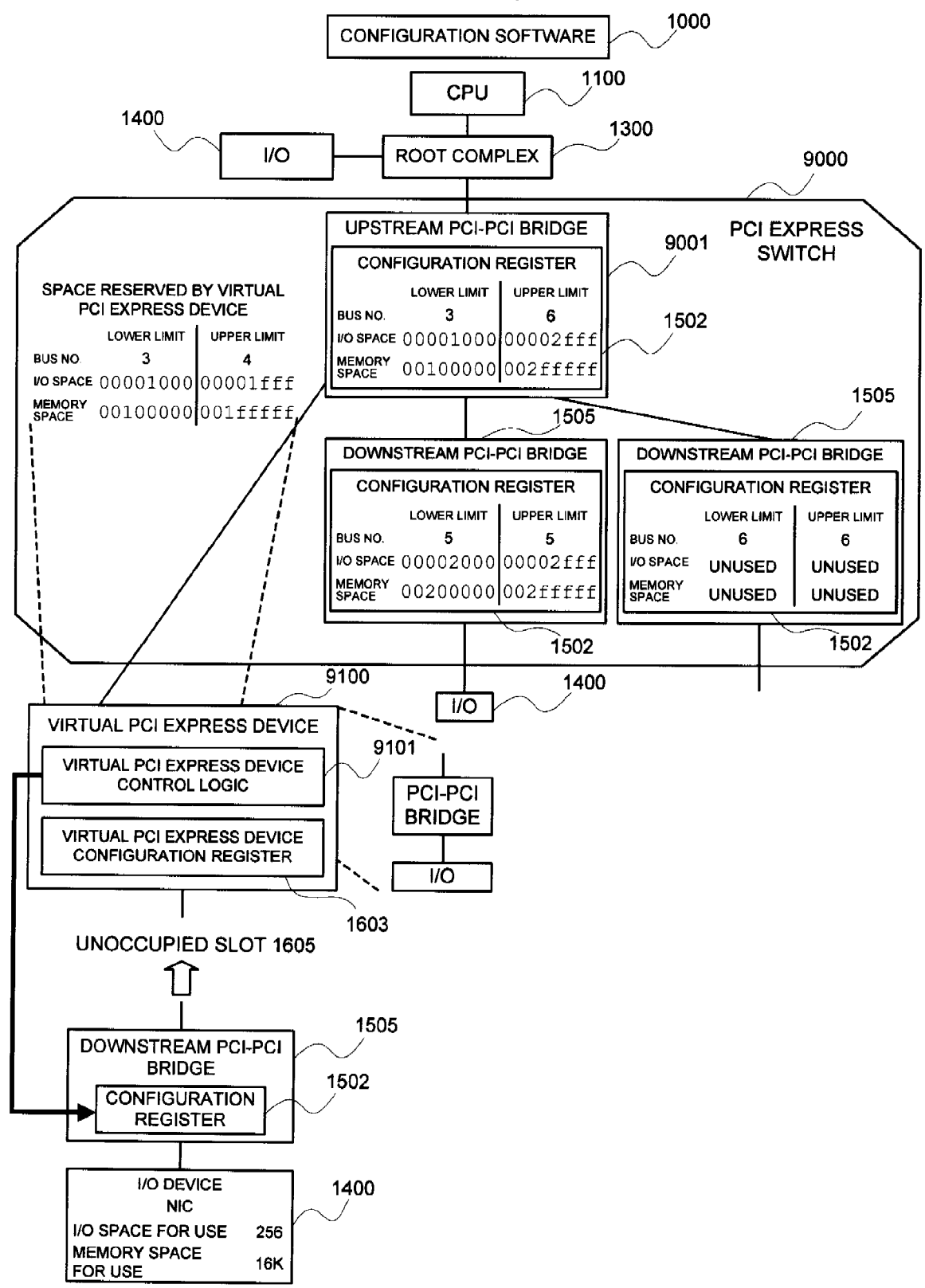
FIG. 15 is a block diagram of a fifth example of the present invention.

Referring to FIG. 15, the present example is different from the first example in that the downstream PCI-PCI bridge 1505 is hot-plugged into the upstream PCI-PCI bridge 9001. In this example, it is assumed that one NIC is connected to the downstream PCI-PCI bridge 1505 to be hot-plugged.

The virtual PCI Express device 9100 virtually indicates the presence of the one downstream PCI-PCI bridge and one I/O device 1400 by the virtual PCI Express device configuration register 1603 to the PCI Express initial configuration cycle, and reserves two bus numbers, 4K of the I/O space and 1M of the memory space. In particular, the virtual PCI Express device configuration register 1603 holds one configuration register of Type 1 and one configuration register of Type 0 to mimic the one PCI-PCI bridge and one I/O device, and also retains topology information representing the topology of one I/O device connected to the PCI-PCI bridge. Based on the topology information, the virtual PCI Express device control logic 9101 performs a write and read operation on each register according to the content of a packet related to a configuration access received from the configuration software 1000, causing the configuration software 1000 to recognize the topology of the virtual device arrangement.

Since the virtual PCI Express device 9100 reserves the PCI Express resource space as described above, the configuration register 1502 provided in the upstream PCI-PCI bridge 9001 indicates the bus numbers 3-6, I/O space 00001000-00002fff, and memory space 00100000-002fffff connected downstream of the bridge 9001 itself, including the PCI Express resource space for use by the I/O device 1400 connected to one of the two downstream PCI-PCI bridges 1505.

In this example, the configuration software 1000 is assumed not to be adapted for hot plugging of the downstream PCI-PCI bridges 1505.

When inserting the downstream PCI-PCI bridge 1505 into the unoccupied slot 1605, the virtual PCI Express device control logic 9101 copies the values in the virtual PCI Express device configuration register 1603 to the configuration register 1502 provided in the inserted downstream PCI-PCI bridge 1505, thereby configuring the downstream PCI-PCI bridge 1505. Since the virtual PCI Express device configuration register 1603 holds one configuration register of Type 1 corresponding to the downstream PCI-PCI bridge 1505, the contents of the register can be directly copied. Subsequently, the virtual PCI Express device control logic 9101 generates an interrupt to the CPU 1100 to notify it of insertion of the NIC mimicking the inserted downstream PCI-PCI bridge 1505. Triggered by the interrupt, the configuration software 1000 configures the NIC. This configuration is all executed in conformance with the procedure defined for hot plugging by the PCI-SIG. The configuration described above is executed solely on the inserted downstream PCI-PCI bridge 1505 and NIC and services provided by other I/O devices 1400 are continued, as in the first embodiment.

Now an exemplary effect of the present application will be described.

According to the present invention, hot plugging of an I/O device etc. into a PCI Express switch etc. can be achieved using existing configuration software. This is because, by using the processing apparatus in accordance with the present invention, a resource space can be reserved for a device anticipated to be installed in the future, and hot plugging of a device can be achieved with respect to the reserved resource space.

Moreover, according to the present invention, hot plugging of a PCI Express switch into a PCI Express switch, hot plugging of a PCI Express switch into a root complex, and hot plugging of a downstream PCI-PCI bridge into an upstream PCI-PCI bridge can be achieved using configuration software that merely supports hot plugging of an I/O device. This is because a controller in the processing apparatus configures the PCI Express switch or downstream PCI-PCI bridge, then generates an interrupt to the CPU, and causes the configuration software to configure each I/O device connected to the inserted PCI Express switch or downstream PCI-PCI bridge.

The present invention may be applied to uses including hot plugging of a hardware device in apparatuses such as a computer apparatus, a storage apparatus, and a network apparatus. Moreover, it may be applied to uses including hot plugging of a hardware device in an information apparatus such as a blade system, for example, in which modularized hardware resources are freely reconfigured to achieve a desired function. Furthermore, it may be applied to uses including hot plugging of a hardware device in a personal computer, a portable digital assistant, or the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A processing apparatus connected to a bus, comprising:
    a slot;
    a pseudo-device comprising one or more configuration registers, and a control section which performs write and read operations on the configuration registers, and transmitting information containing a request for a resource space of a device to a CPU, wherein the pseudo-device mimics a response indicating that the device is present; and
    a communication relay which relays communication between said bus and said pseudo-device when the device for using the resource space reserved by said pseudo-device is not connected to said slot, and for relaying communication between said bus and said slot when said device is connected to said slot.

2. A processing apparatus according to claim 1, wherein said pseudo-device retains topology information of said pseudo-device itself, and said controller performs write and read operations on said configuration registers based on said topology information.

3. A processing apparatus according to claim 1, wherein when the device has been inserted into said slot, said control section generates an interrupt to the CPU by notifying a neighboring downstream bridge of insertion of the device.

4. A processing apparatus according to claim 1, wherein said controller generates a first interrupt to a CPU when a device is removed from said slot and said slot is an unoccupied slot, and generates a second interrupt to said CPU when a new device is inserted into said unoccupied slot.

5. A processing apparatus according to claim 1, wherein said controller uses information on a resource space allocated to said pseudo-device to partially or fully make a configuration on said device inserted into said slot.

6. A processing apparatus according to claim 5, wherein said controller generates an interrupt to a CPU upon completion of said configuration.

7. A processing apparatus according to claim 6, wherein said configuration made by said controller before generating said interrupt is directed to a device which is not supported by configuration on a device made by configuration software activated by an interrupt to said CPU.

8. A processing apparatus according to claim 3, wherein said interrupt is in compliance with a procedure for hot plugging defined by PCI-SIG Standards.

9. A processing apparatus according to claim 1, wherein standards of said bus are PCI.

10. A processing apparatus according to claim 1, wherein standards of said bus are PCI-X.

11. A processing apparatus according to claim 1, wherein standards of said bus are PCI Express.

12. A processing apparatus according to claim 11, wherein said processing apparatus is connected to or incorporated into a device constituting a PCI Express switch.

13. A processing apparatus according to claim 12, wherein said device to be connected to said slot is any one of an I/O device, a PCI Express switch, and a downstream PCI-PCI bridge.

14. A processing apparatus according to claim 11, wherein said processing apparatus is connected to or incorporated into a device constituting a root complex.

15. A processing apparatus according to claim 14, wherein said device to be connected to said slot is any one of an I/O device and a PCI Express switch.

16. The processing apparatus according to claim 1, wherein during an initial configuration by configuration software executed by a CPU in a system upstream of said bus from said processing apparatus and wherein no device is connected to said slot, said configuration software allocates resource space to said pseudo-device; and
    when a device is inserted into said slot, at least a portion of said resource space allocated to said pseudo-device is allocated to said device inserted into said slot.

17. A method of modifying a system configuration, comprising:
    making an initial configuration by configuration software executed by a CPU in a system with a processing apparatus incorporated into said system, said processing apparatus connected to a bus, and comprising a slot, a pseudo-device comprising one or more configuration registers and a control section which performs write and read operations on the configuration registers, and transmitting information containing a request for a resource space of a device to a CPU, wherein the pseudo-device mimics a response indicating that the device is present, and a communication relay which relays communication between said bus and said pseudo-device when the device for using the resource space reserved by said pseudo-device is not connected to said slot, and for relaying communication between said bus and said slot when the device is connected to said slot; and
    when a device is inserted into said slot, making a configuration on said inserted device.

18. A method of modifying a system configuration according to claim 17, wherein said pseudo-device retains topology information of said pseudo-device itself, and said controller performs write and read operations on said configuration registers based on said topology information.

19. A method of modifying a system configuration according to claim 17, wherein when the device has been inserted into said slot, said control section generates an interrupt to the CPU by notifying a neighboring downstream bridge of insertion of the device.

20. A method of modifying a system configuration according to claim 17, wherein said controller generates a first interrupt to a CPU when a device is removed from said slot and said slot is an unoccupied slot, and generates a second interrupt to said CPU when a new device is inserted into said unoccupied slot.

21. A method of modifying a system configuration according to claim 17, wherein, said controller uses information on a resource space allocated to said pseudo-device during said initial configuration, to partially or fully make a configuration on said device inserted into said slot.

22. A method of modifying a system configuration according to claim 21, wherein said controller generates an interrupt to said CPU upon completion of said configuration.

23. A method of modifying a system configuration according to claim 22, wherein said configuration made by said controller before generating said interrupt is directed to a device which is not supported by configuration on a device made by configuration software activated by an interrupt to said CPU.

24. A method of modifying a system configuration according to claim 19, wherein said interrupt is in compliance with a procedure for hot plugging defined by PCI-SIG Standards.

25. A method of modifying a system configuration according to claim 24, wherein said configuration made by said configuration software activated by said interrupt is in compliance with said procedure for hot plugging defined by said PCI-SIG Standards.

26. A method of modifying a system configuration according to claim 17, wherein standards of said bus are PCI.

27. A method of modifying a system configuration according to claim 17, wherein standards of said bus are PCI-X.

28. A method of modifying a system configuration according to claim 17, wherein standards of said bus are PCI Express.

29. A method of modifying a system configuration according to claim 28, wherein said processing apparatus is connected to or incorporated into a device constituting a PCI Express switch, and said device to be connected to said slot is any one of an I/O device, a PCI Express switch, and a downstream PCI-PCI bridge.

30. A method of modifying a system configuration according to claim 28, wherein said processing apparatus is connected to or incorporated into a device constituting a root complex, and said device to be connected to said slot is any one of an I/O device and a PCI Express switch.

31. The method of modifying a system configuration according to claim 17, wherein during said making of said initial configuration by configuration software and wherein no device is connected to said slot, said configuration software allocates resource space to said pseudo-device; and
    when a device is inserted into said slot, at least a portion of said resource space allocated to said pseudo-device is allocated to said device inserted into said slot.

* * * * *